United States Patent [19]

Sato et al.

[11] Patent Number: 5,322,340
[45] Date of Patent: Jun. 21, 1994

[54] VEHICLE UNDERFLOOR STRUCTURE

[75] Inventors: Manabu Sato, Yokohama; Hiroyuki Shiozawa, Yokosuka; Moritsune Nakata, Yokohama, all of Japan

[73] Assignee: Nissan Motor Co., Ltd., Yokohama, Japan

[21] Appl. No.: 66,200

[22] Filed: May 25, 1993

[30] Foreign Application Priority Data

May 29, 1992 [JP] Japan .................. 4-138440

[51] Int. Cl.⁵ .............. B62D 35/02; B60K 11/00
[52] U.S. Cl. .................. 296/180.1; 296/180.5; 296/185; 296/208; 296/209; 180/68.1; 180/68.2; 180/903
[58] Field of Search ............ 296/180.1, 180.5, 185, 296/208, 209; 180/68.1, 68.2, 903

[56] References Cited

U.S. PATENT DOCUMENTS

| | | | |
|---|---|---|---|
| 1,925,415 | 9/1933 | Strauss | 180/68.1 |
| 4,772,060 | 9/1988 | Kretschmer | 296/180.1 |
| 5,013,080 | 5/1991 | Garrone et al. | 296/180.5 |

FOREIGN PATENT DOCUMENTS

| | | | |
|---|---|---|---|
| 723728 | 8/1942 | Fed. Rep. of Germany | 180/68.1 |
| 60-105526 | 7/1985 | Japan. | |
| 2-61792 | 5/1990 | Japan. | |
| 4356225 | 12/1992 | Japan | 180/68.1 |

Primary Examiner—Dennis H. Pedder
Attorney, Agent, or Firm—Foley & Lardner

[57] ABSTRACT

In order to effectively cool an underfloor part, such as a transmission or a rear differential, and improve the aerodynamic conditions of the rear wheels, a front under member serving as a bottom of a front part of the vehicle is formed with left and right air passages for discharging inside air in the front part of the vehicle toward the rear wheels, and a middle air passage for contracting an outside underfloor air stream coming from the front of the vehicle, and directing the underfloor air stream along the center line of the vehicle.

32 Claims, 28 Drawing Sheets

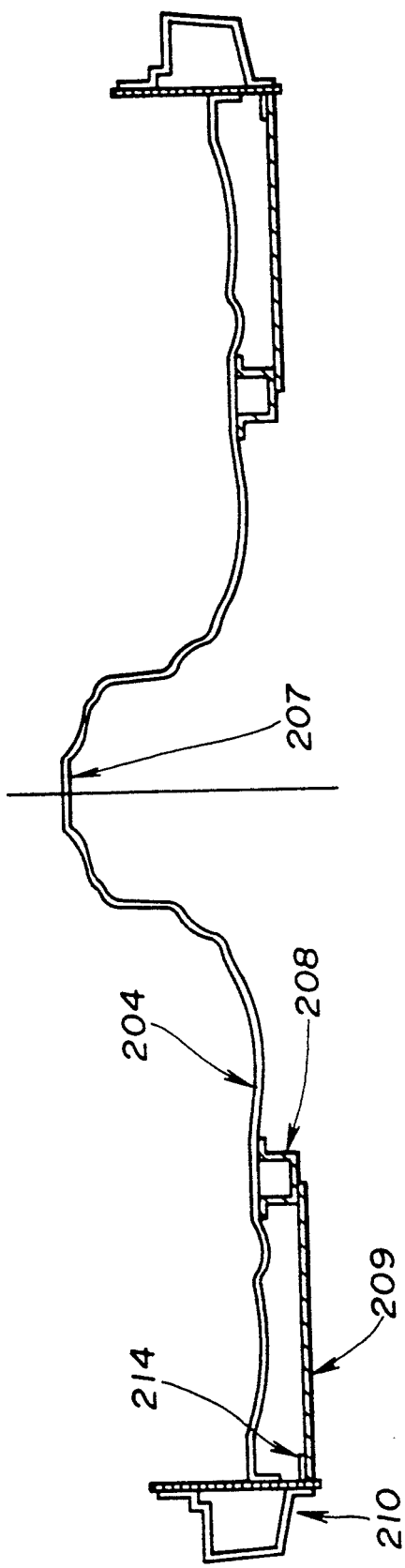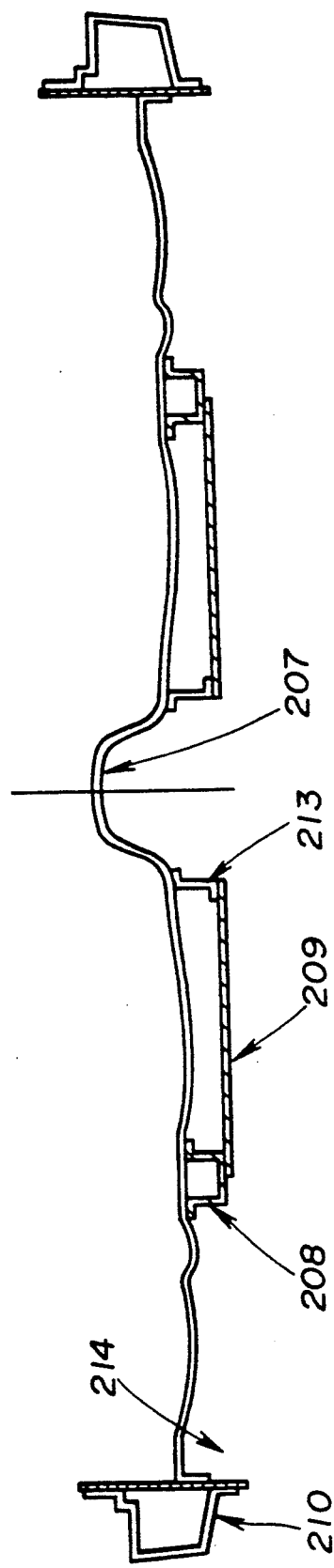

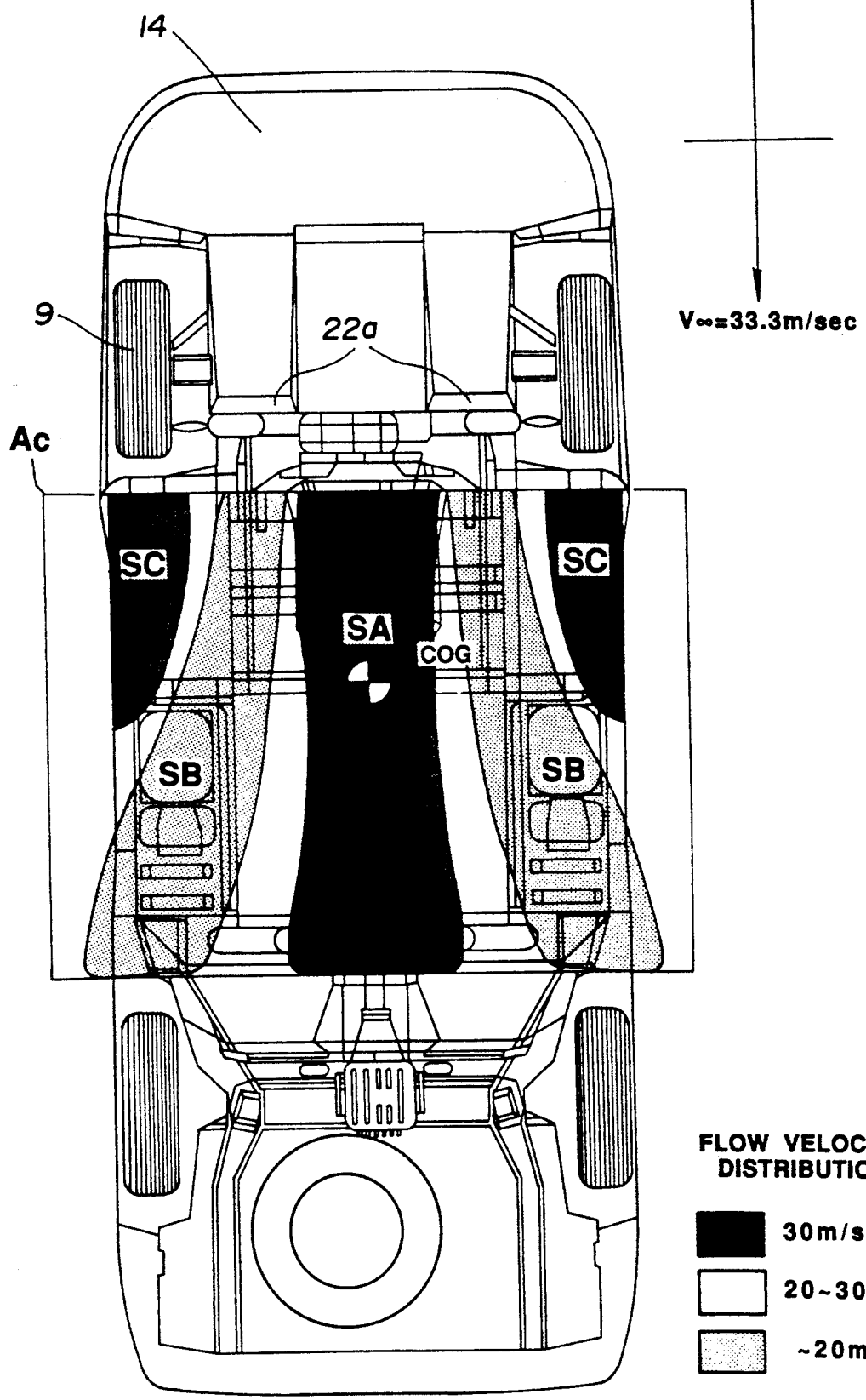

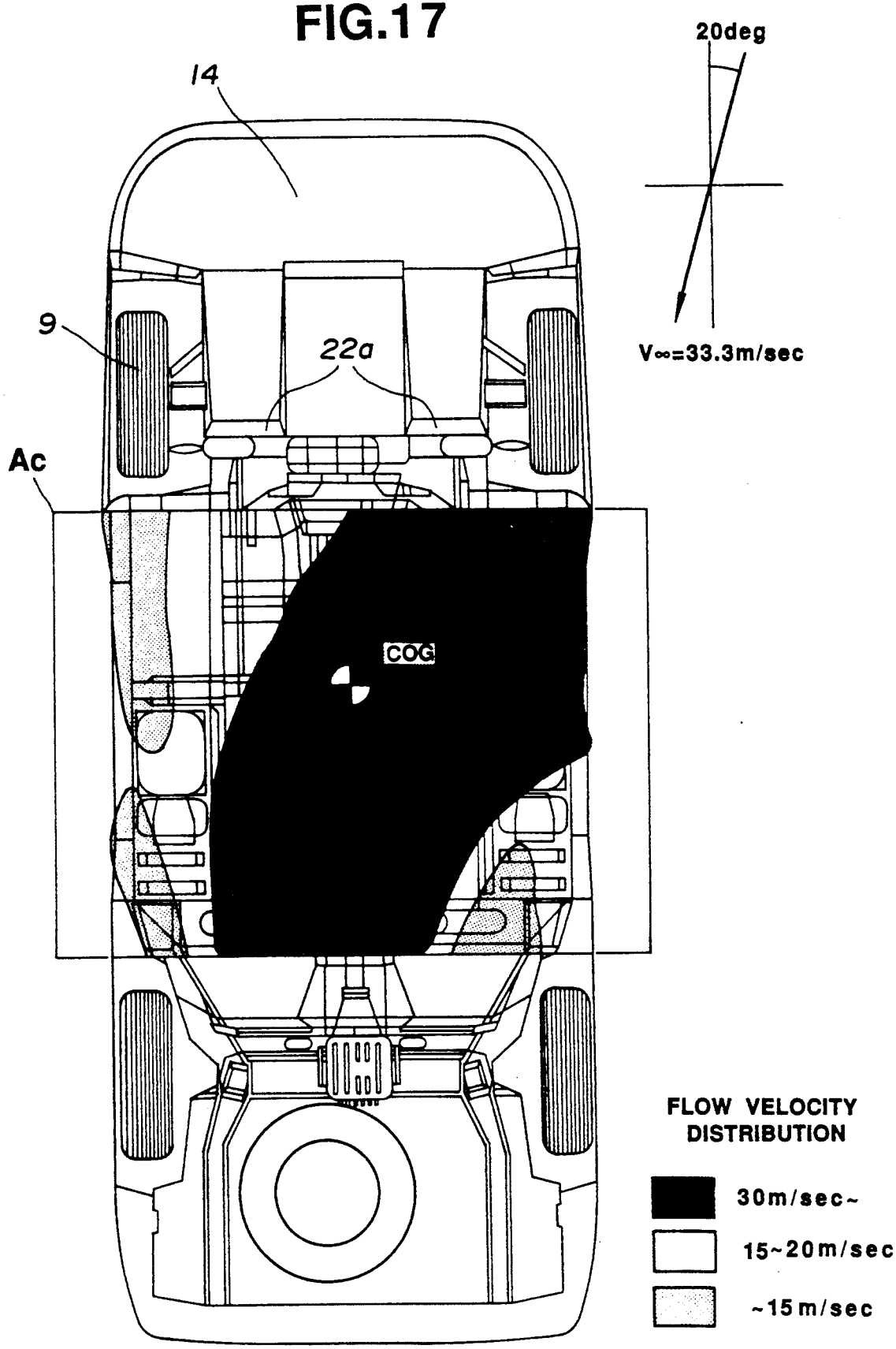

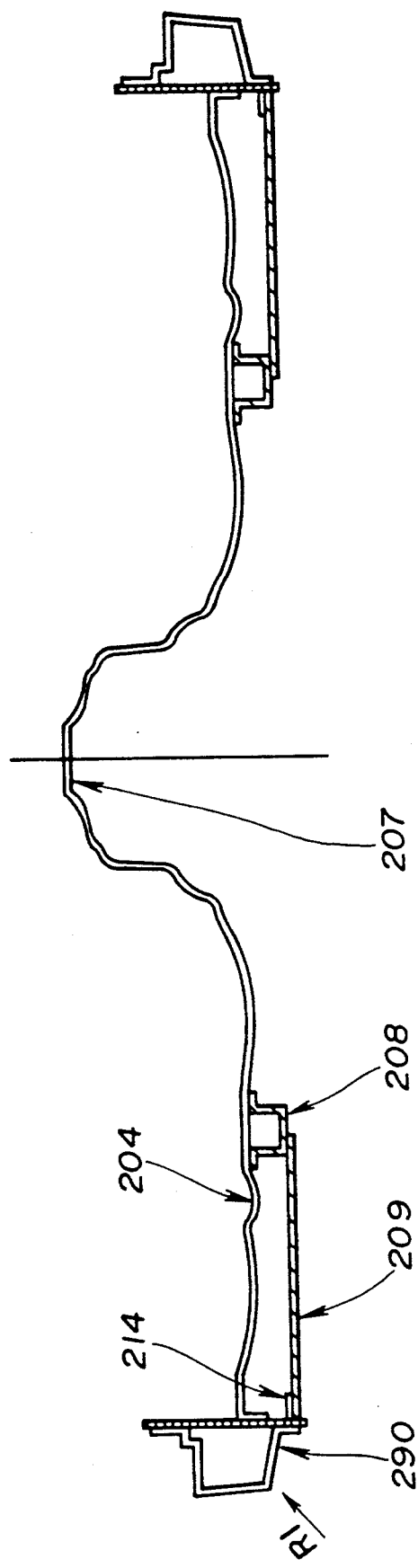
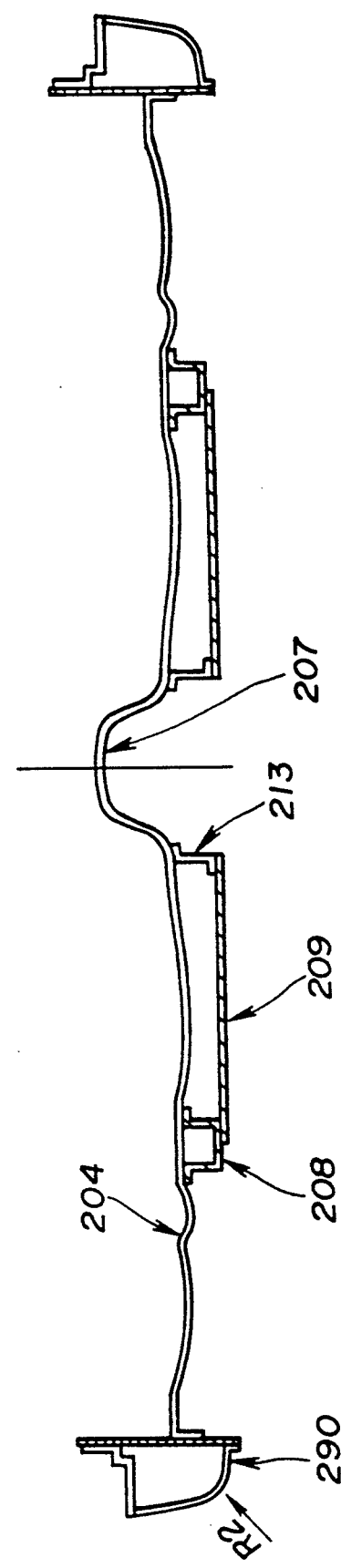
FIG.21A
FIG.21B

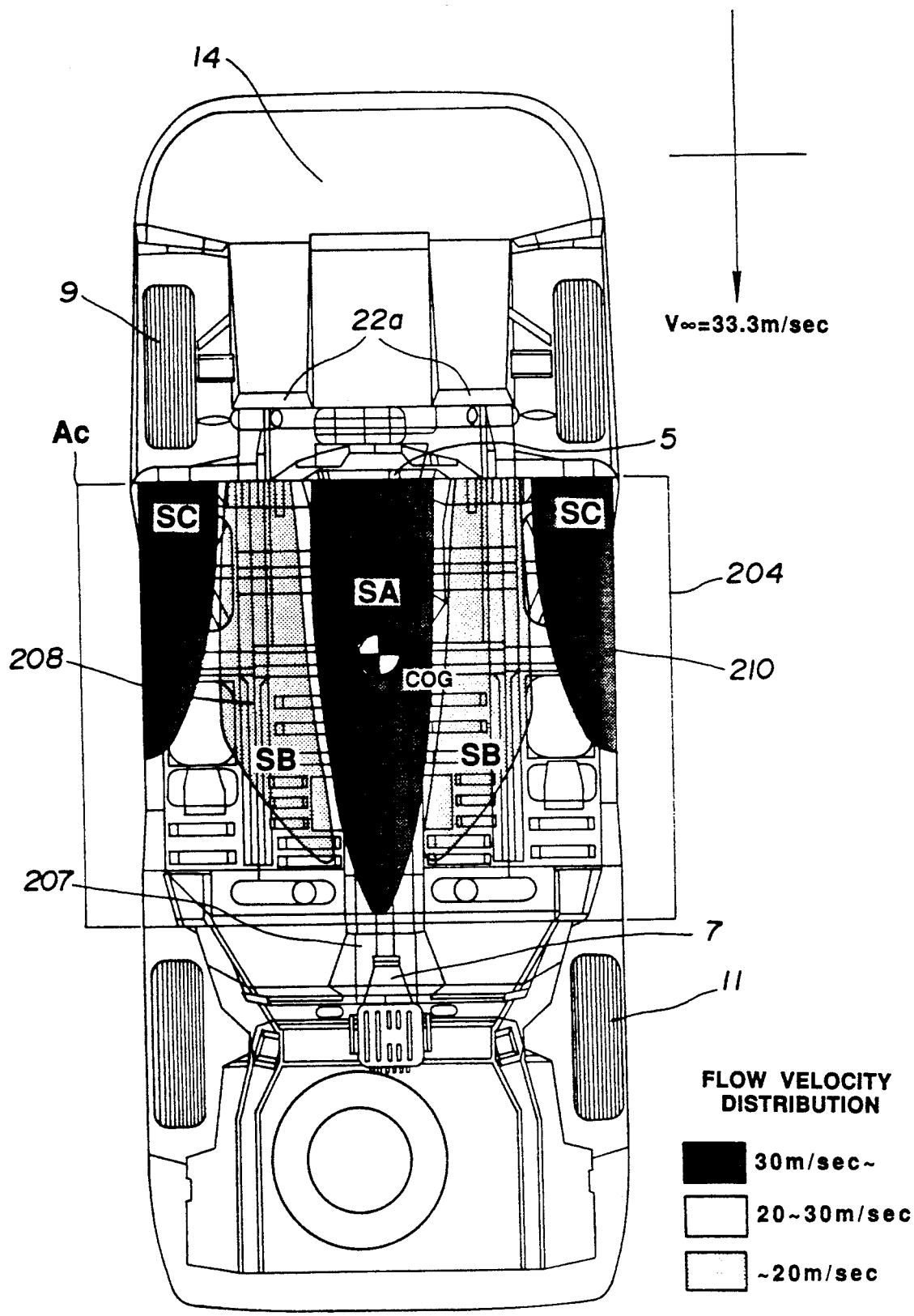

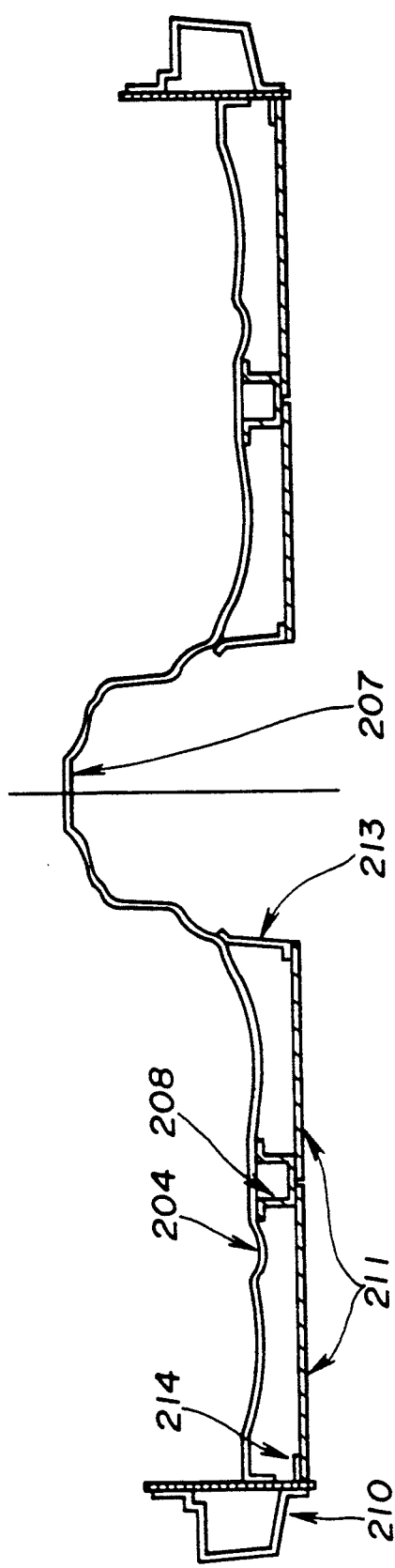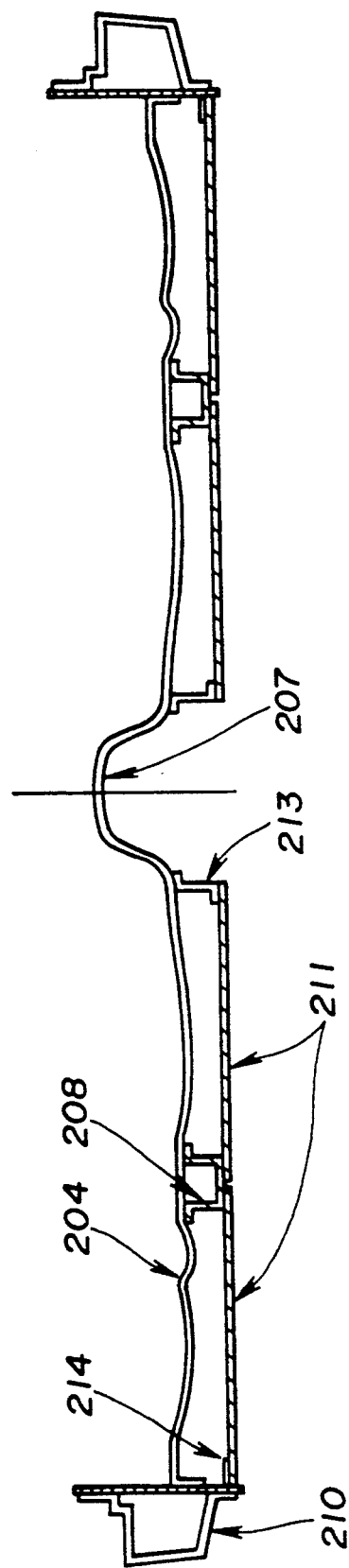

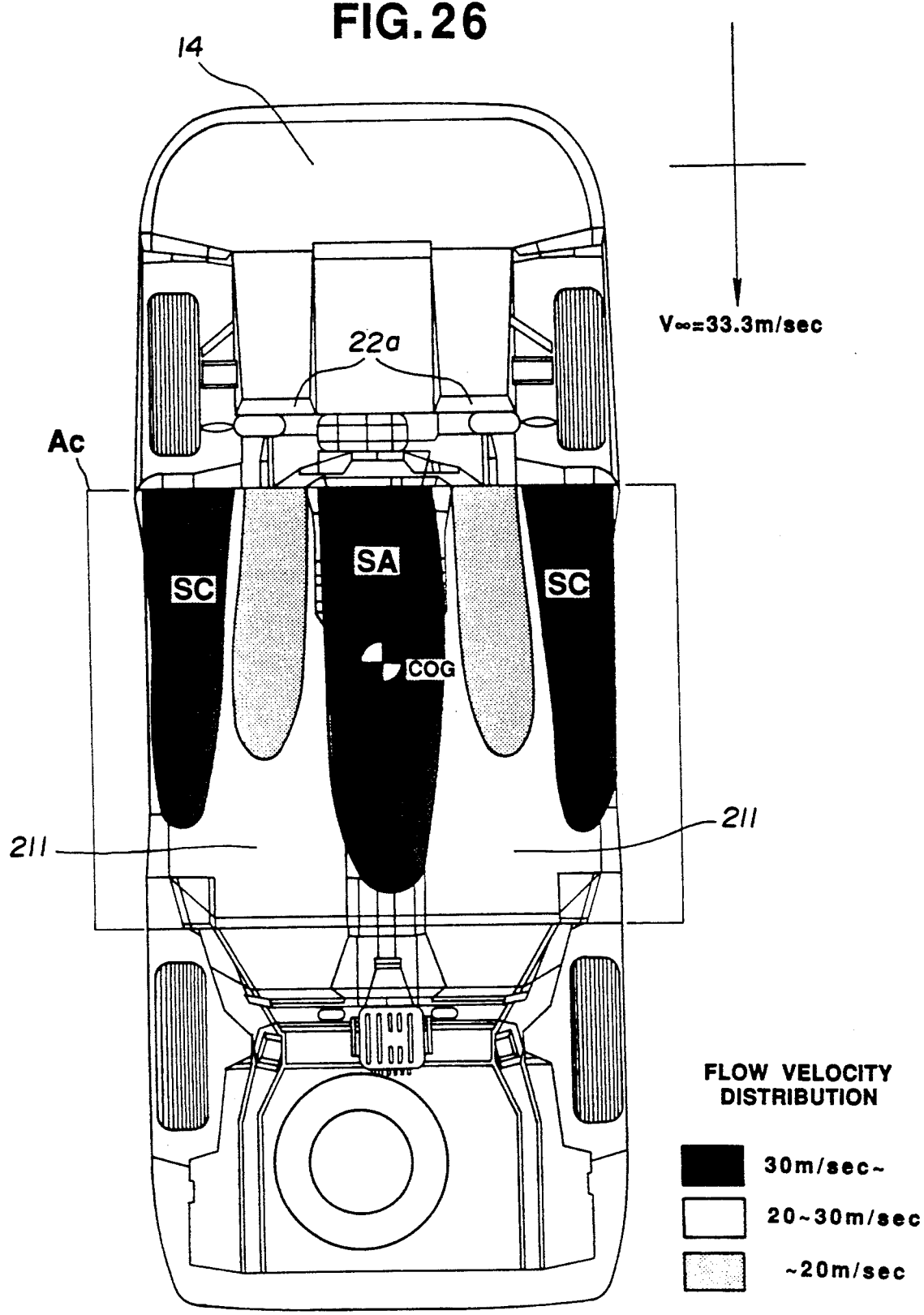

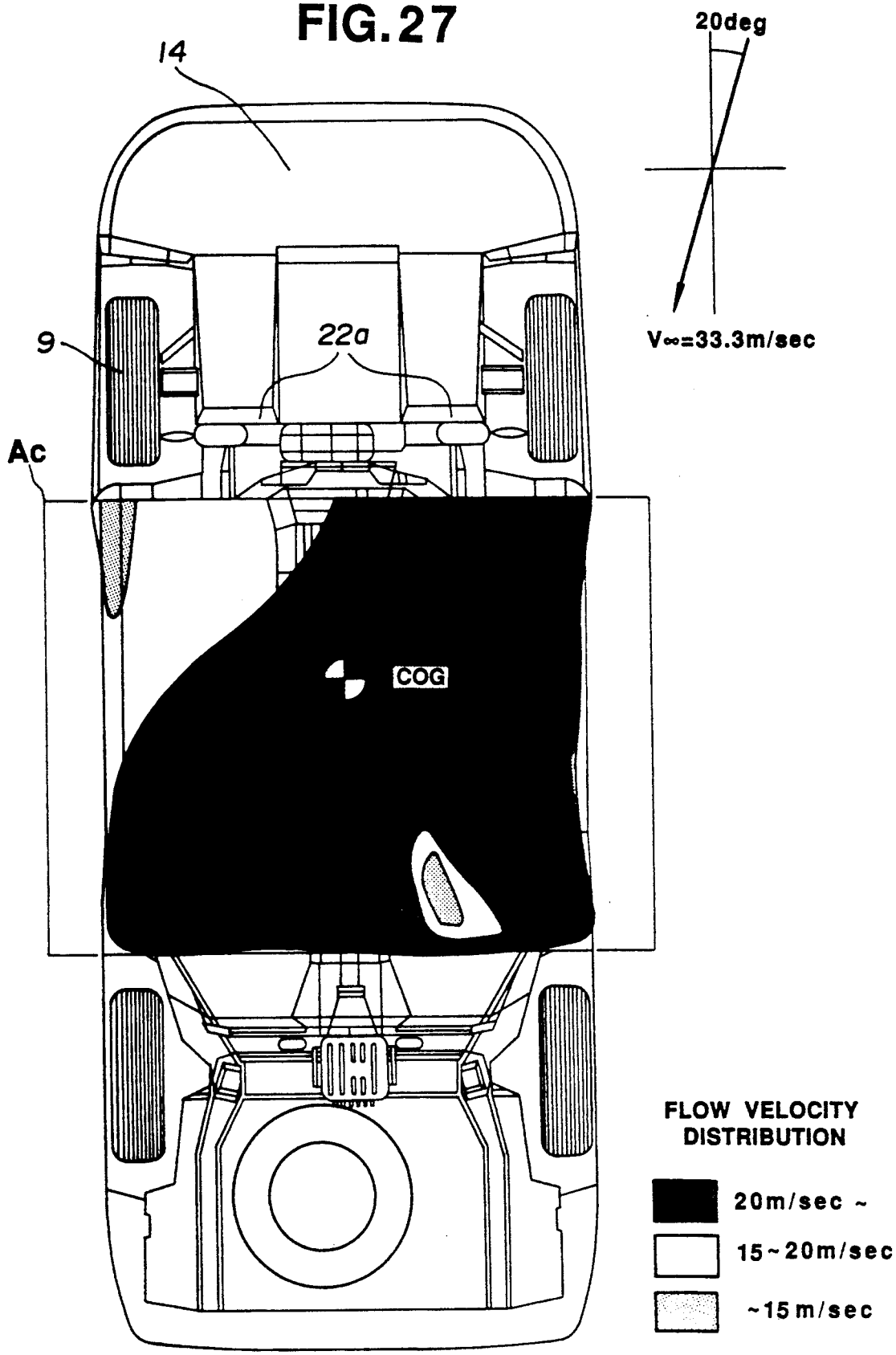

_5,322,340_

VEHICLE UNDERFLOOR STRUCTURE

BACKGROUND OF THE INVENTION

The present invention relates to a vehicle underfloor structure.

One conventional vehicle underfloor structure employs an under cover closing the underside of the engine room. This under cover is made as flat as possible, and formed with louvers (14a in FIG. 28) for discharging the hot air inside the engine room. Japanese Utility Model Provisional Publication No. 60-105526 shows a similar conventional example.

In the conventional structure, the hot air discharged from the louvers tends to slow down the underfloor air stream as shown by velocity profiles u1-u4 in FIG. 28 while the rear wheels receive the relatively fast outside air streams.

SUMMARY OF THE INVENTION

It is an object of the present invention to provide a structure of a vehicle which can positively utilize the air discharged from a front interior space, such as an engine room, of the vehicle.

It is another object of the present invention to provide a vehicle structure which can improve the air cooling ability for cooling a underfloor component, such as a transmission and a rear differential, and improve the aerodynamic conditions of the rear wheels of the vehicle by utilizing the air discharged from the front interior space of the vehicle.

It is still another object of the present invention to provide a vehicle structure having a bottom surface which can reduce an aerodynamically induced yawing moment.

According to the present invention, a vehicle, or a structure of a vehicle, comprises at least a (first or front) under member for closing an underside of a front part, such as a front engine compartment, of the vehicle. The under member comprises left and right portions for discharging inside air from the front part of the vehicle to the outside toward the rear of the vehicle, and a throttle (middle) portion for contracting an outside air stream flowing under the under member from the front of the vehicle toward the rear of the vehicle, and for guiding the outside air stream toward an underfloor unit, such as a transmission or a differential. The throttle portion extends between the left and right portions.

In this structure, the air stream discharged from each of the left and right portions is relatively slow in flow speed and high in air pressure. These slow air streams flow rearwards while expanding laterally until they impinge the rear wheels on the left and right sides. On the other hand, the outside air stream guided by the throttle portion is confined, contracted and speeded up by the left and right air streams discharged from the left and right portions. As a result, the structure according to the invention can reduce the drag force at each rear wheel and improve the cooling efficiency.

A vehicle or a structure of a vehicle, according to the present invention may further comprise a center floor structure defining a bottom surface underneath which the left and right discharged air streams and the outside air stream flow. The bottom surface may be made flat in such a manner as to further improve the aerodynamic conditions.

BRIEF DESCRIPTION OF THE DRAWINGS

FIG. 8 is a graph showing variation of the transmission cooling wind velocity. FIG. 9 is a graph showing variation of the rear differential cooling wind velocity. FIG. 10 is a graph showing variation of the front wheel lift and the rear wheel lift.

FIG. 11 is a graph showing variation of the rear wheel lift in a side wind situation.

FIGS. 15A and 15B are sectional views taken across line S15A-S15A and line S15B-S15B in FIG. 14.

FIGS. 16 and 17 are bottom views illustrating underfloor air streams under a center floor structure of the vehicle shown in FIG. 14, respectively, when the vehicle is receiving a straight wind and when the vehicle is receiving a side wind.

FIGS. 21A and 21B are sectional views corresponding to FIGS. 15A and 15B, but showing a variation of the center floor structure according to the sixth embodiment.

FIGS. 22 and 23 are bottom views illustrating underfloor air streams (the results of experiments) in a vehicle having the front under cover according to the first embodiment, and a non-flat center floor, respectively, in the straight wind situation and the side wind situation.

FIGS. 25A and 25B are sectional views taken across line S25A-S25A and line S25B-S25B of FIG. 24.

FIGS. 26 and 27 are bottom views showing underfloor streams (the results of experiments) under the full flat center floor structure, respectively, in the straight wind situation and the side wind situation.

DETAILED DESCRIPTION OF THE INVENTION

Figure 1:
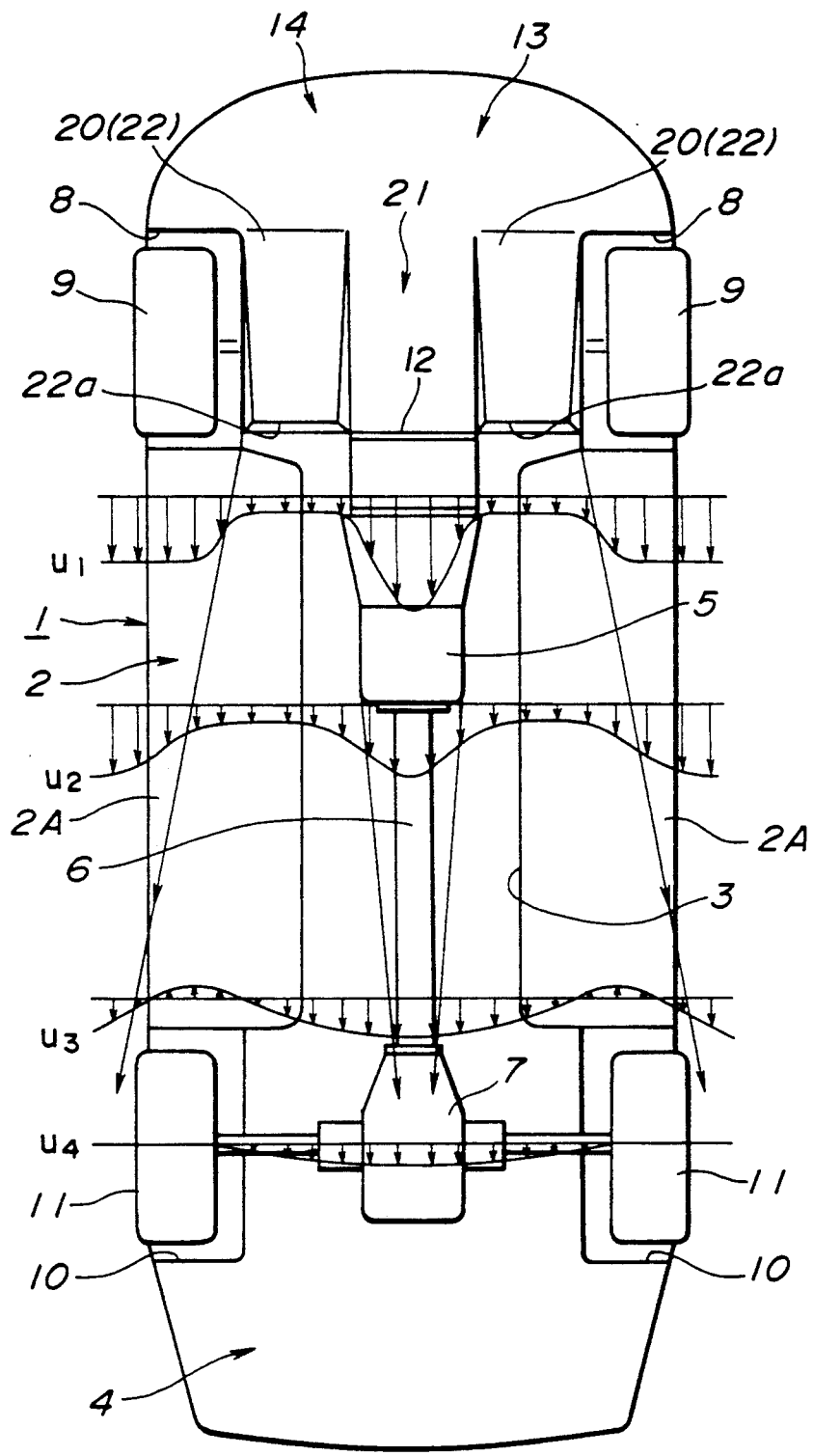
FIG. 1 is a bottom view showing the bottom of a vehicle according to a first embodiment of the present invention.
Figure 2:
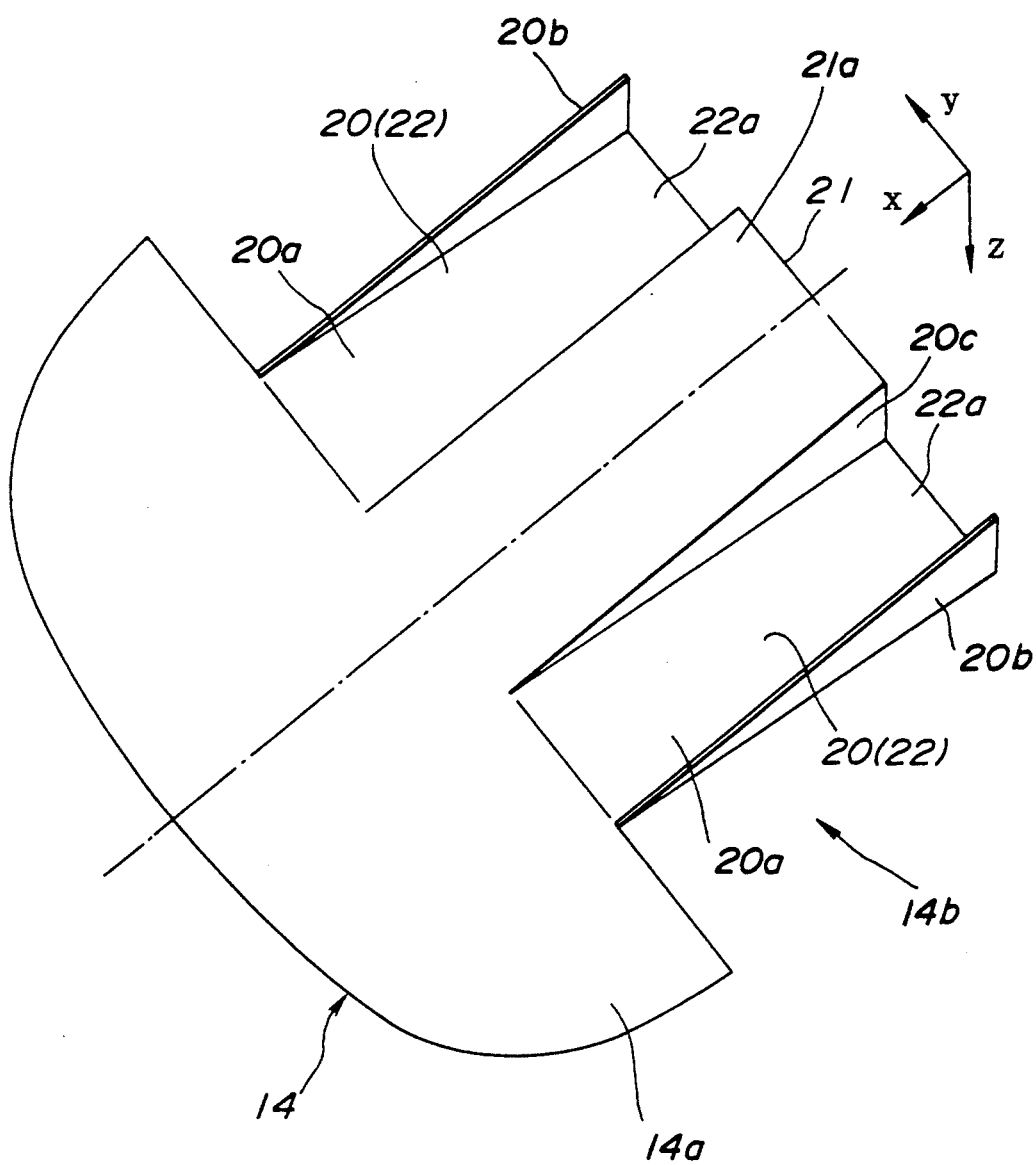
FIG. 2 is a perspective view showing a front under member of the structure shown in FIG. 1.

FIGS. 1 and 2 show a vehicle underfloor (or underbody) structure according to a first embodiment of the present invention.

A vehicle shown in FIG. 1 includes a vehicle body 1, left and right front wheels 9, and left and right rear wheels 11.

The vehicle body 1 includes a center floor 2 which is formed with a floor tunnel 3 extending along the longitudinal x axis of the vehicle body in the middle of the center floor 2, and a rear floor 4. The vehicle further includes an engine, and a drive system which, in this example, includes at least a transmission 5, a propeller shaft 6, and a rear differential 7, which are disposed under the floor tunnel 3 and the rear floor 4, as shown in the bottom view of FIG. 1.

The vehicle body 1 has left and right front wheel housings (or wheel houses) 8 each defining a cavity (sometimes called a wheel well) for accommodating one of the front wheels 9, and left and right rear wheel housings 10 for the rear wheels 11. The center floor 2 extends between the front and rear wheel housings 8 and 10. The rear floor 4 extends from the rear end of the center floor 2 to the rear end of the vehicle.

The vehicle body 1 has a front compartment (or high pressure portion) 13 which is defined by one or more front upper members. In this example, the front compartment is an engine compartment (or engine room) 13, which is bounded at least by the left and right front wheel housings 8 on the lateral sides, and a dash lower panel 12 (constituting a bulkhead) on the rear side. The vehicle further includes a front under member 14 which, in this example, is a generally flat front under cover which serves as the bottom of the front engine compartment by closing an underside of the front engine compartment 13. The front under cover 14 is in the form of a panel made of resin, or steel. In the latter case, for example, the front under cover 14 is in the form of a shaped steel sheet or plate.

The front under cover 14 of this example includes a front portion 14a and a rear portion 14b extending from a rear end of the front portion 14a toward the rear of the vehicle. The width of the rear portion 14b of the front under cover 14 of this example is smaller than the width of the front portion 14a, as shown in FIG. 2. The rear portion 14b has left and right side portions (or hot air discharging portions) 20 and a middle portion 21a located between the left and right side portions 20. Each of the left and right side portions 20 defines a side channel (or duct) 22 which opens upwards. The middle portion 21a defines a middle channel (or throttle portion) 21 which opens downwards. The left and right side channels 22 are substantially symmetrical with respect to a center line of the front under cover 14, and with respect to a center line of the vehicle. In other words, the left and right side channels 22 are substantially symmetrical with respect to an imaginary vertical center (x-z) plane which is perpendicular to the body lateral (or pitching) y axis of the vehicle, and which contains the body longitudinal (or rolling) x axis and the vertical (or yawing) z axis of the vehicle. The front under cover 14 of this example has a shape of bilateral symmetry, and is placed symmetrically between the left and right front wheel housings 8.

The left and right side channels 22 extend along the longitudinal axis of the vehicle, from the inside space of the engine compartment 13 to the outside of the engine compartment. Therefore, the left side channel 22 allows inside air in the engine compartment 13, to flow out toward the left rear wheel 11. Similarly, the inside air flows through the right side channel 22 to the outside of the vehicle, and further flows toward the right rear wheel 11. The middle channel 21 also extends along the longitudinal axis of the vehicle between the left and right channels 22. The middle channel 21 performs the function of contracting the outside air stream flowing from the front of the vehicle underneath the front under member 14, and guides the outside air stream toward a heat generating portion which, in this example, includes the transmission 5 and the rear differential 7 under the center floor 2 and the rear floor 4.

In the example shown in FIG. 2, each of the left and right side portions 20 of the front under cover 14 includes a sloping portion 20a, and outer (outboard) and inner (inboard) upright portions 20b and 20c. The sloping portion 20a of each side portion 20 is flat but inclined. Each sloping portion 20a slopes down toward the rear of the vehicle. The upright portions 20b and 20c of each side portion 20 of this example are substantially vertical, and substantially parallel to the vertical center plane of the vehicle. In each side channel 22, the sloping portion 20a servers as the bottom of the approximately U-shaped channel, and the outer and inner upright portions 20b and 20c serve as the side walls of the U-shaped channel.

The front portion 14a and the middle portion 21a are both flat, and form a continuous flat T-shaped upper surface, as shown in FIG. 2. This flat upper surface is substantially horizontal and perpendicular to the vertical axis of the vehicle. The sloping portion 20a of each side portion 20 slopes down from the front portion 14a to a rear end of the sloping portion which is lower (in height) than the middle portion 21a. Accordingly, each of the upright portions 20b and 20c is triangular, as shown in FIG. 2. The left and right side channels 22 are depressed below the flat and horizontal plane formed by the front portion 14a and the middle portion 21a. In this embodiment, the middle channel 21 is defined by the downwardly facing lower surface of the middle portion 21a and the left and right inner (inboard) upright portions 20c. The middle channel 21 is shaped like an inverted U.

The flat middle portion 21a is substantially perpendicular to the vehicle body vertical z axis, and accordingly parallel to the imaginary x-y horizontal plane. The height (that is, the z coordinate) of the flat middle portion 21a is substantially equal to the height of a flat (generally lowermost) portion of the bottom of an oil pan placed under the engine. The rear end of the sloping portion 20a of each side portion 20 is lower in height (z coordinate) than the bottom of the oil pan.

Each of the left and right side channels 22 has a rear open end 22a for discharging the inside hot air from the inside of the engine compartment 13, to the outside. The rear open ends 22a are formed by the rear end of the front under cover 14, at the rear end of the engine compartment 13. The width of the middle channel 21 is approximately equal to one third of the lateral distance between the left and right front wheel housings 8, and approximately equal to the width of the transmission 5 located directly rearward of the middle channel 21. The width of the transmission 5 is the lateral dimension measured in parallel to the lateral axis of the vehicle.

In the thus-constructed vehicle lower structure shown in FIGS. 1 and 2, the hot inside air of the engine compartment 13 flows out through the open ends 22a of the left and right side channels 22, and forms left and right side air streams flowing toward the left and right wheels 11, respectively. As the left and right side streams flow rearwards, the side streams expand, and their flow velocities become significantly low near the rear wheels 11. On the other hand, the outside air stream flows from the front of the vehicle under the front under cover 14, and flows into the middle channel 21 to form a center stream. This center stream further flows toward the transmission 5 and the propeller shaft 6 while being confined between the above-mentioned left and right side streams. This center (or middle) air stream passing through the middle channel 21 is contracted and accelerated by the throttling effect of the middle channel 21, and the restriction of the left and right side streams which are high in pressure and low in velocity. Therefore, this underfloor structure creates a distribution of flow velocities under the center floor 2 and the rear floor 4 which are located on the downstream rear side of the front under cover 14, as shown by velocity profiles u1, u2, u3 and u4 in FIG. 1.

As a result, this underfloor structure can lower the aerodynamic force which each rear wheel receives, and the air resistance acting on the vehicle. Besides, this structure can increase the velocity of the center air stream used for cooling the surfaces of the transmission 5 and the rear differential 7, and by so doing, improve the cooling effect. Specifically, the middle channel 21 having the width corresponding to the width of the transmission 5 can effectively cool the transmission 5 by causing the cool outside air to impinge at high speeds on the whole of the transmission 5.

Figure 8:
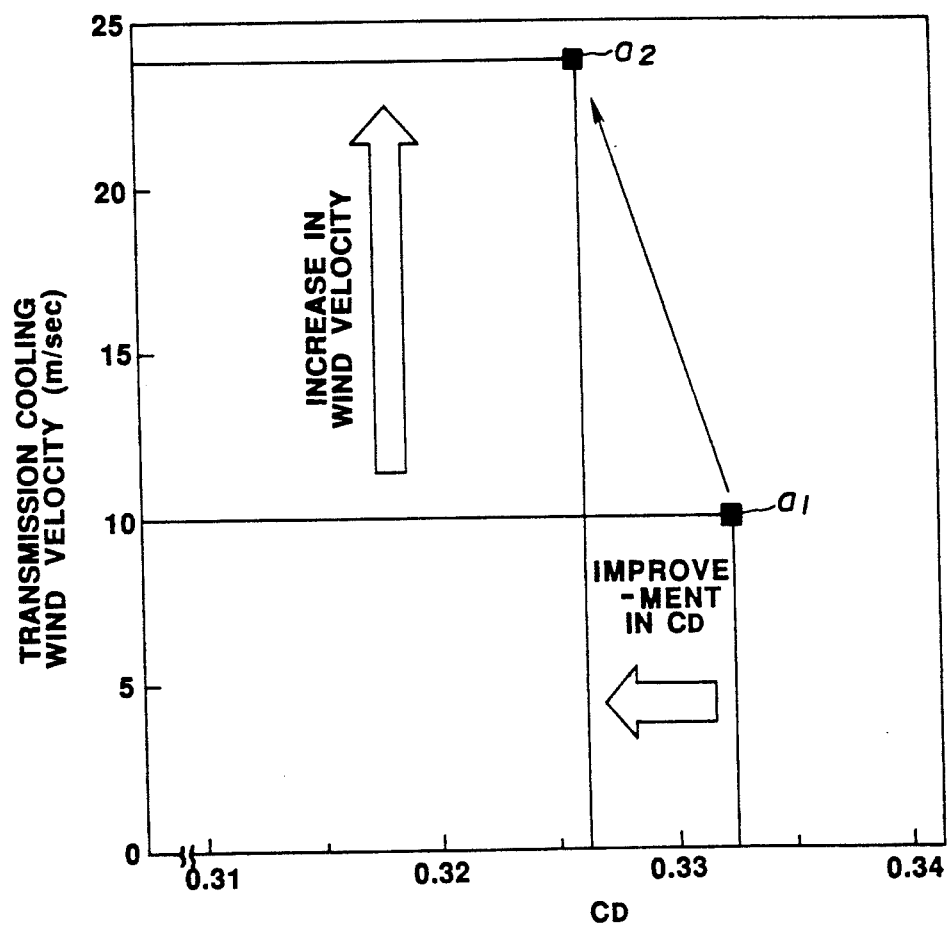
FIGS. 8, 9 and 10 show effects of the under cover according to the invention.
Figure 9:
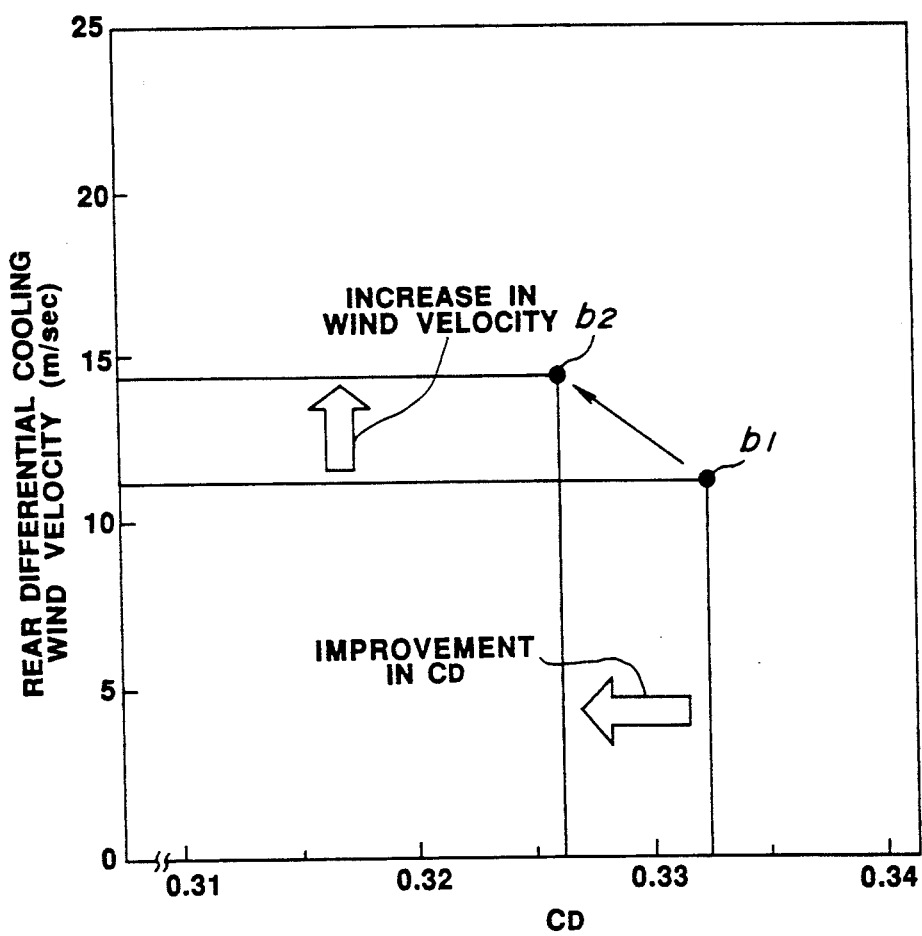

According to wind tunnel tests corresponding to a vehicle speed of 120 km/h, the vehicle underfloor structure of this example can increase the wind velocity of the air for cooling the transmission 5 from a1 to a2 as shown in FIG. 8, and the wind velocity of the air cooling the rear differential 7 from b1 to b2 as shown in FIG. 9. Therefore, this structure can efficiently decrease the oil temperature in the transmission 5 and the rear differential 7, and protect them against heat. Moreover, this structure can decrease the lift acting on the vehicle by increasing the velocity of the underfloor air flow.

As shown in FIGS. 8 and 9, this underfloor structure can reduce the air resistance (or the drag force coefficient) of the vehicle by reducing the drag at the rear wheels 11. The high pressure slow air stream discharged from each of the side channels 22 flows toward the corresponding rear wheel 11 and reduces the drag at the rear wheel by preventing a high velocity air stream under the outboard part of a side floor 2A from impinging on the rear wheel 11.

Figure 10:
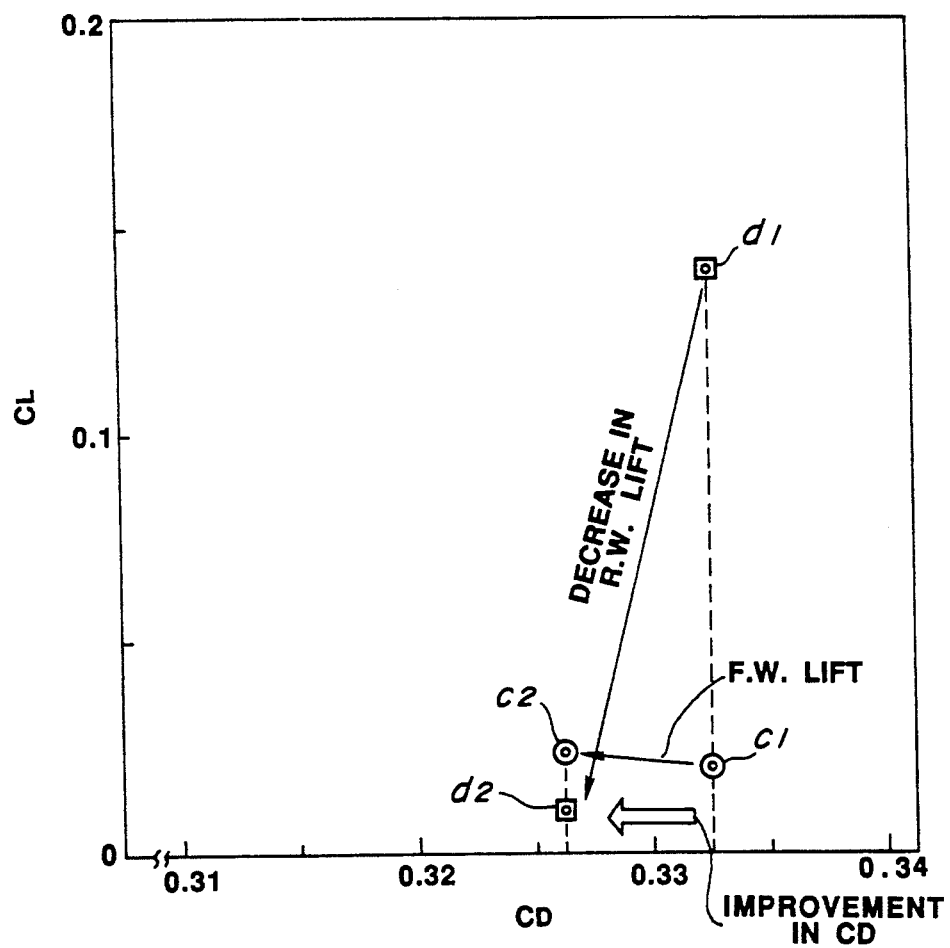
Figure 28:
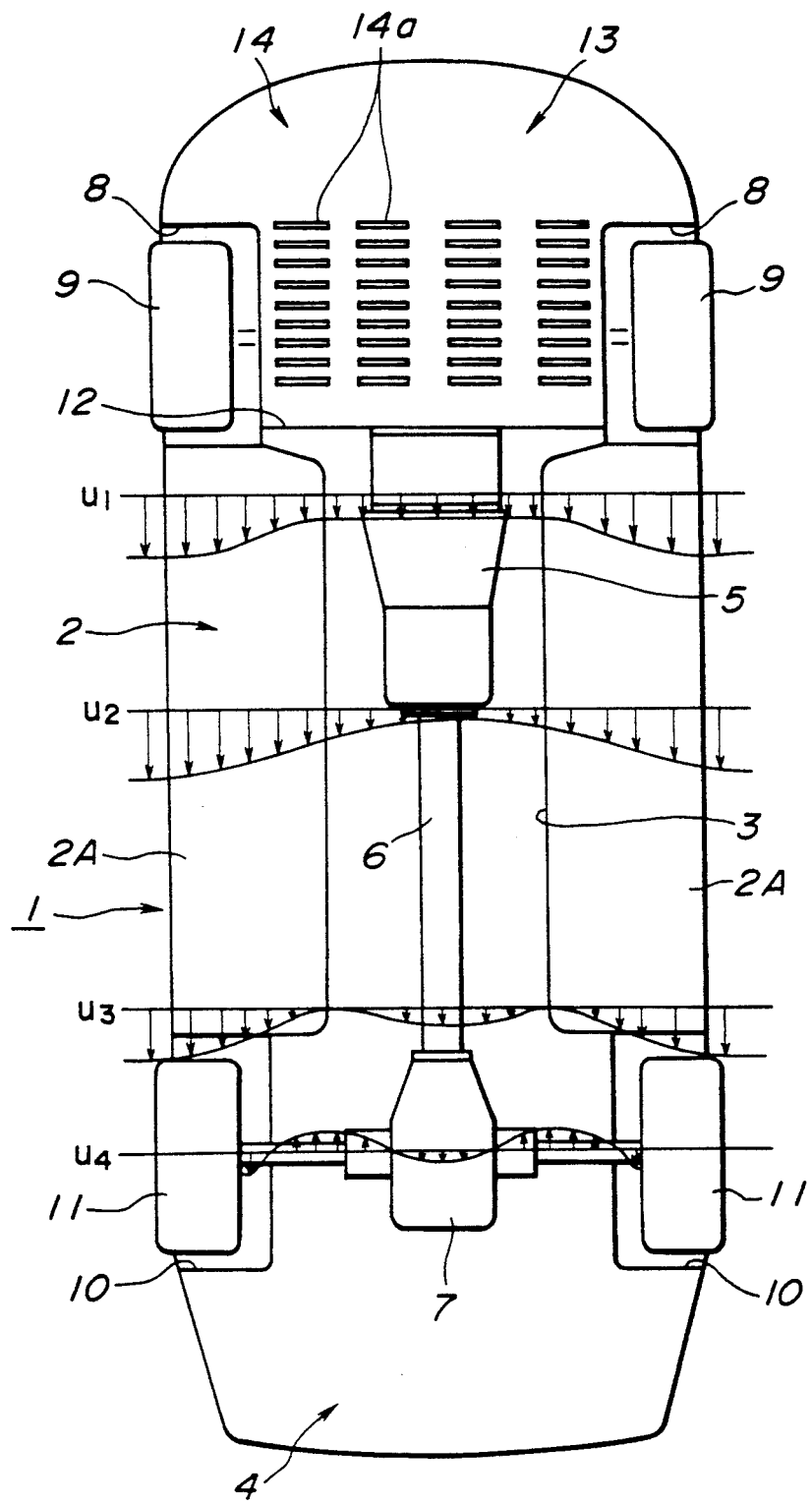
FIG. 28 is a bottom view showing the bottom of a conventional vehicle.

FIG. 10 shows changes in lift forces of the front wheels 9 and the rear wheels 11. The underfloor structure according to this embodiment can reduce both of the front wheel lift and the rear wheel lift, as shown in FIG. 10. The front wheel lift force is not changed so much, compared with the conventional structure, as shown by a shift from c1 to c2 in FIG. 10. However, the underfloor structure according to this embodiment of the invention can reduce the rear wheel lift force (or the lift force coefficient) remarkably from d1 to d2. This remarkable decrease in the rear wheel lift can be explained by the velocity profiles u3 and u4 near and at the rear wheel axle. As evident from the comparison between the profiles shown in FIG. 1 and the profiles in the conventional design shown in FIG. 28, the structure of the embodiment can significantly improve the velocity profiles u3 and u4, and causes a negative pressure to develop around the rear wheel axle.

In this way, the underfloor structure according to this embodiment can improve the cooling ability for the underfloor parts of the vehicle and reduce the drag force and the lift force of the vehicle. Moreover, the side channels 22 which are inclined, depressed, extended toward the rear, and opened at (or near) the rear end of the engine compartment, can promote the rearward movement of the air heated inside the engine compartment, and prevent the discharged inside hot air from reentering the engine compartment 13 from the front radiator even when the vehicle speed is very slow in traffic congestion. The hot air discharged from each side channel 22 is unlikely to stagnate under the front under cover 14. The under cover 14 closes the underside of the engine compartment 13 entirely, and prevents the air from entering the engine compartment 13 from below.

Figure 3:
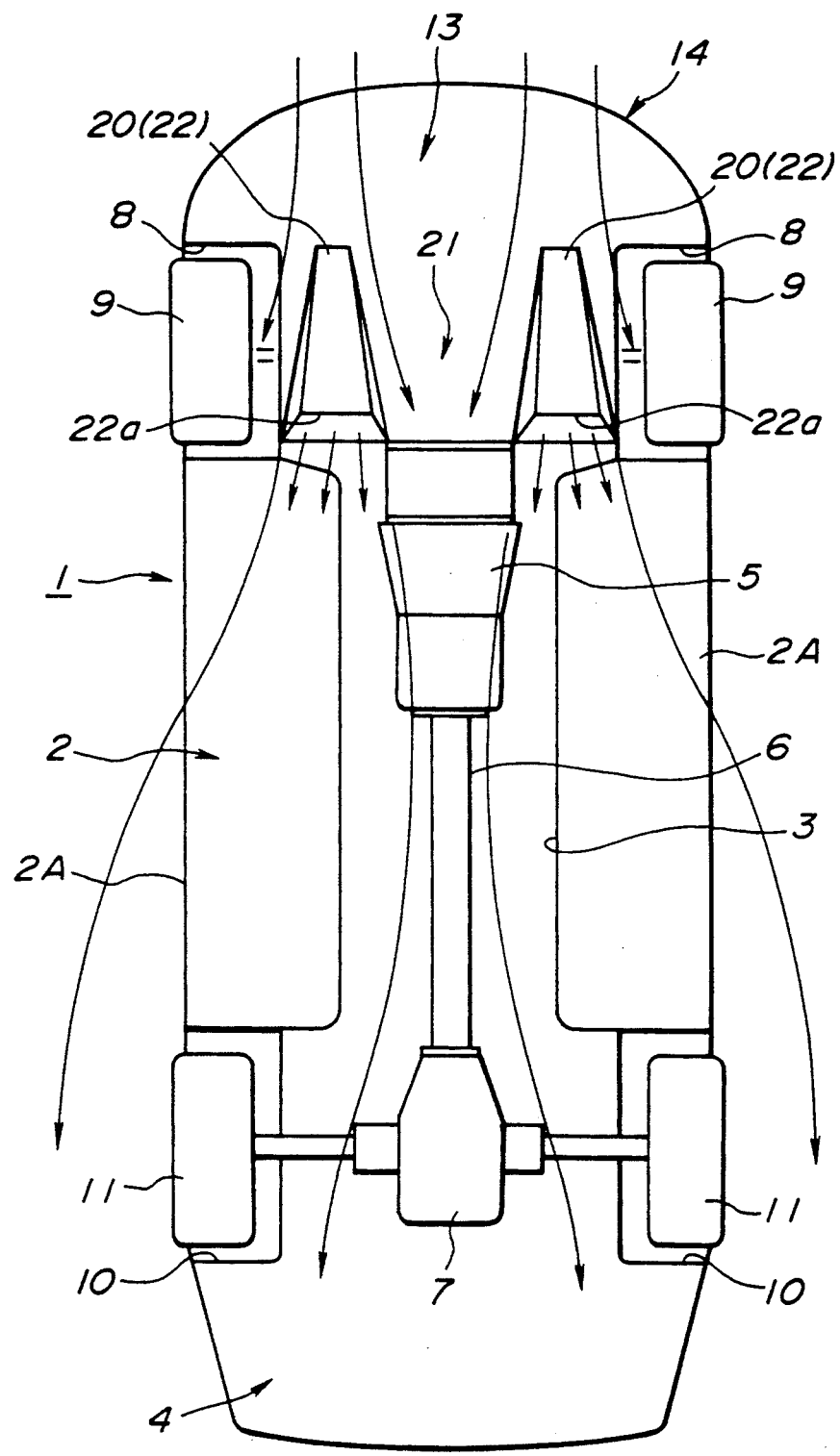
FIG. 3 is a bottom view showing the bottom of a vehicle according to a second embodiment of the present invention.

FIG. 3 shows a vehicle underfloor structure according to a second embodiment of the present invention. In the second embodiment, each of the left and right side channels 22 is shaped like a fan, so that the width becomes greater toward the rear of the vehicle. On the other hand, the middle channel 21 is tapered so that the width becomes smaller toward the rear of the vehicle. The width of each channel is a dimension measured along the vehicle body lateral axis or the vehicle's widthwise direction. The tapered middle channel 21 of the second embodiment can widely collect the incoming air stream, and effectively contract the air stream. The tapered middle channel 21, therefore, can improve the throttling effect, and further increase the velocity of the middle underfloor air stream around the center line of the vehicle floor. The fanlike side channels 22 promote the lateral expansion of the side streams discharged from the engine compartment, and accordingly improve the reduction of the drag at the rear wheels 11.

Figure 4:
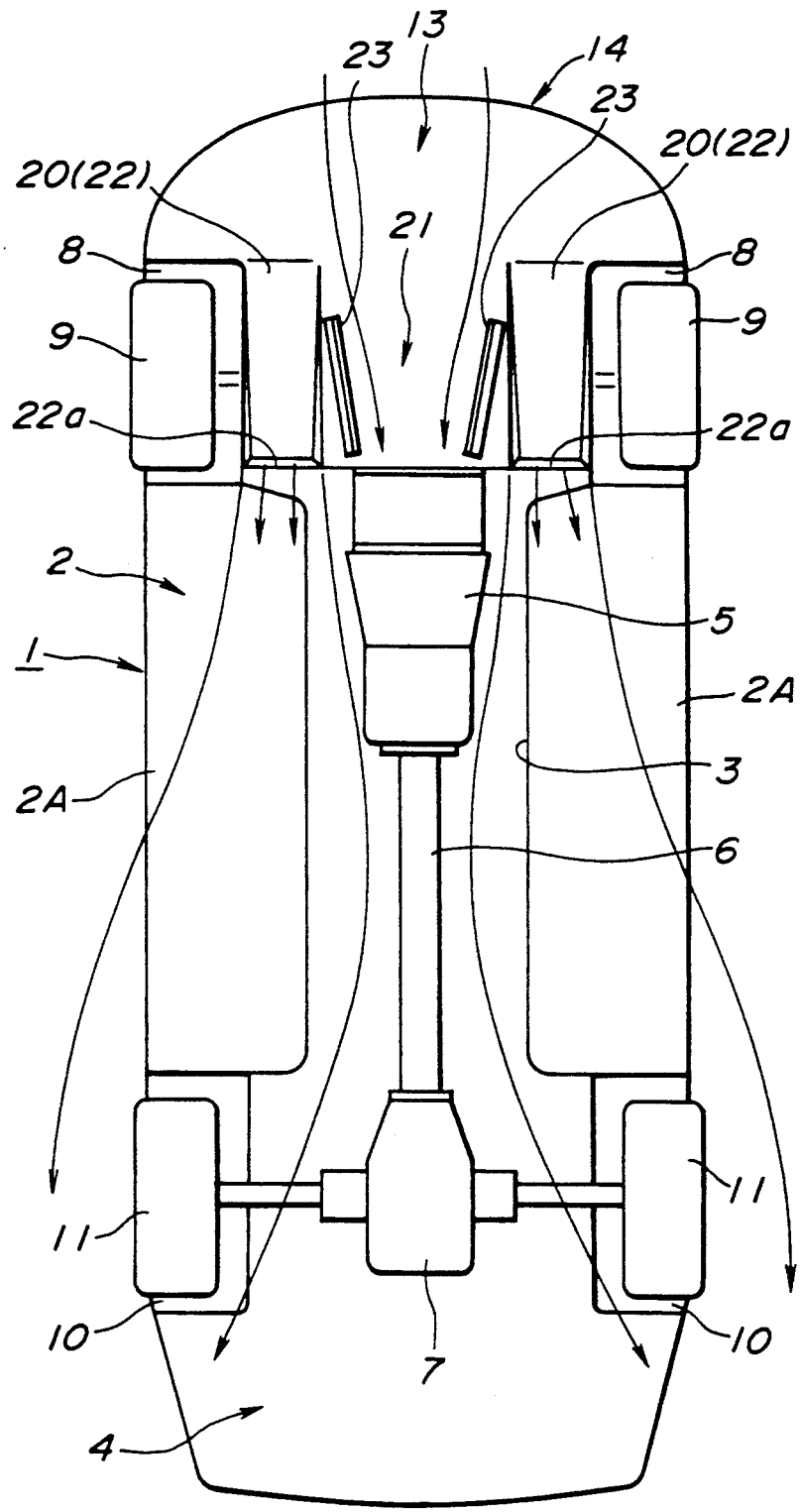
FIG. 4 is a bottom view showing the bottom of a vehicle according to a third embodiment of the invention.

FIG. 4 shows an underfloor structure according to a third embodiment of the invention. The structure shown in FIG. 4 further comprises left and right baffle plates 23 which project downwards from the underside of the middle portion 21a of the front under cover 14. The baffle plates 23 are arranged obliquely so as to form a tapered middle channel 21 whose width becomes smaller toward the rear of the vehicle. In the example shown in FIG. 4, each side channel 22 is bounded by the side walls which are substantially parallel with each other as in the first embodiment.

Figure 5:
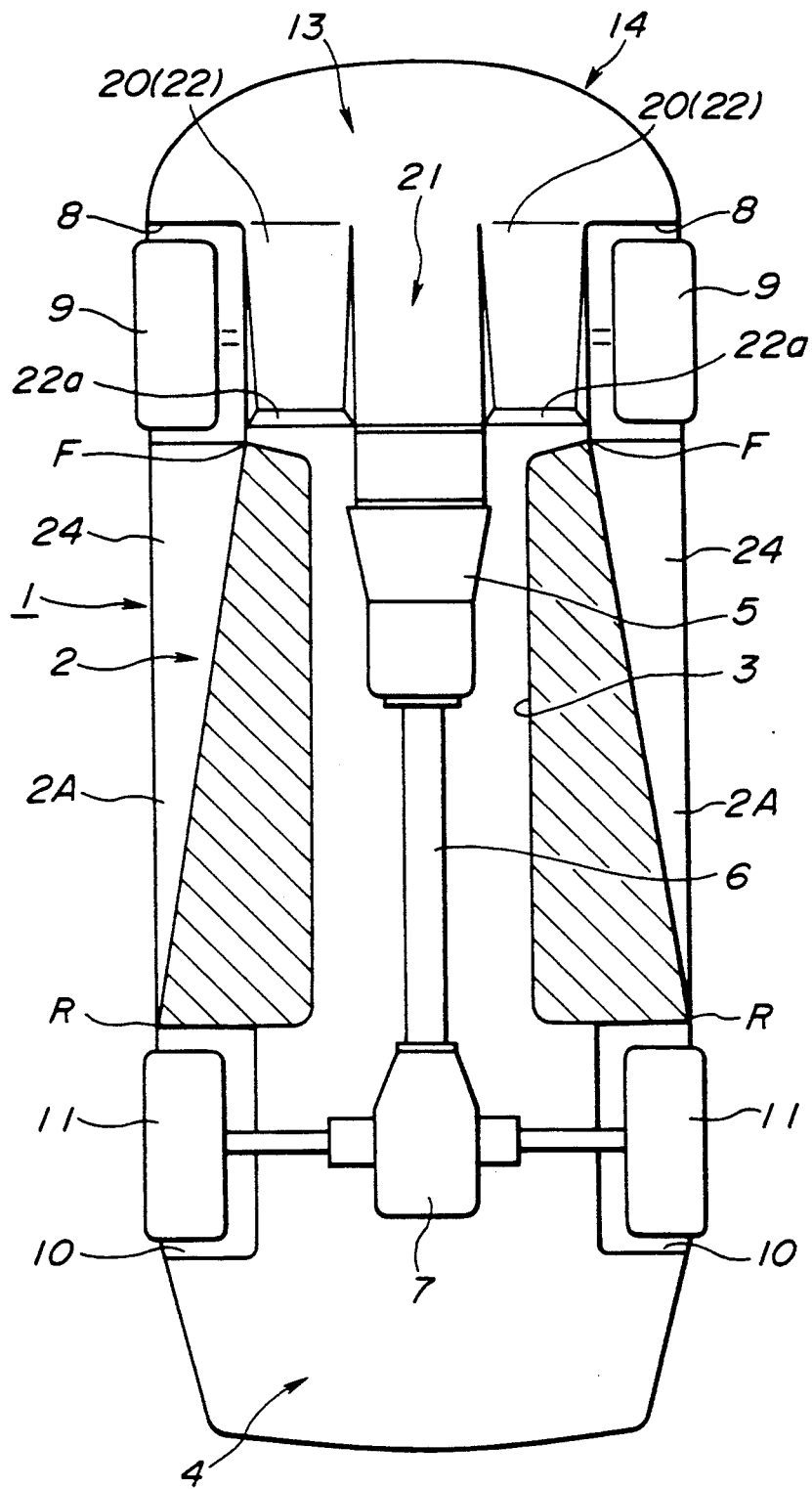
FIG. 5 is a bottom view showing the bottom of a vehicle according to a fourth embodiment of the present invention.

FIG. 5 shows an underfloor structure according to a fourth embodiment of the present invention. The structure shown in FIG. 5 has left and right side flat under covers 24 which are fixed to the center floor 2. The flat side under covers 24 are in the form of a flat panel of resin or steel, for example. Each flat side under cover 24 extends from the rear end of the front wheel housing 8 to the front end of the rear wheel housing 10.

The center floor 2 has the floor tunnel 3, and left and right lateral side portions 2A which are separated by the floor tunnel 3. In each of the left and right lateral side portions 2A of the center floor 2, the left or right flat side under cover 24 makes the underside of the vehicle body flat in an outboard triangular region bounded by an oblique straight line extending from a front point F to a rear point R as shown in FIG. 5. The front point F is located at the position of the outboard end of the open end 22a of the duct 22 along the lateral axis of the vehicle. The rear point R is located at the outboard end of a front border of the rear wheel housing 10 extending along the lateral axis. In each side floor portion 2A of the center floor 2, the outboard region on the outboard side of the oblique line extending from the front point F to the rear point R is made flat by the flat side under cover 24. On the other hand, the inboard region shown by hatching in FIG. 5 on the inboard side of the oblique line in each lateral side portion 2A is not made flat. Therefore, in this inboard region of each side, beads of the floor and pipes are bared and exposed to the outside underfloor air stream.

As shown in FIG. 5, the flat outboard regions on the left and right sides are symmetrical with respect to the imaginary vertical center plane of the vehicle. The rear open ends 22a of the left and right side channels 22 are both located between the left and right front points F along the lateral axis of the vehicle. The lateral distance between the left and right front points F may be equal to or greater than the lateral distance between the outboard ends of the rear open ends 22a of the left and right side channels 22. In this example, the lateral distance between the left and right front points F is substantially equal to the lateral distance between the outboard ends of the left and right open ends 22a. The lateral distance between the left and right front points F is smaller than the lateral distance between the left and right rear points R. The lateral distance between the left and right oblique lines becomes gradually greater toward the rear of the vehicle.

The flat side under cover 24 on each side can reduce the air resistance of the high speed outermost underfloor air stream flowing rearwards on the outboard side of the slow side stream discharged from the side channel 22. The uneven (non-flat) inboard region (shown by hatching) on each side decreases the speed of the hot slow side stream coming from the side channel 22, and further decreases the drag at the rear wheel 11. This uneven region does receive the drag force. However, the air stream in this inboard region is slow, so that the increase of the drag in this uneven region is very small as compared with the decrease in the drag at the rear wheel 11. As a whole, this underfloor structure can reduce the drag.

Figure 6:
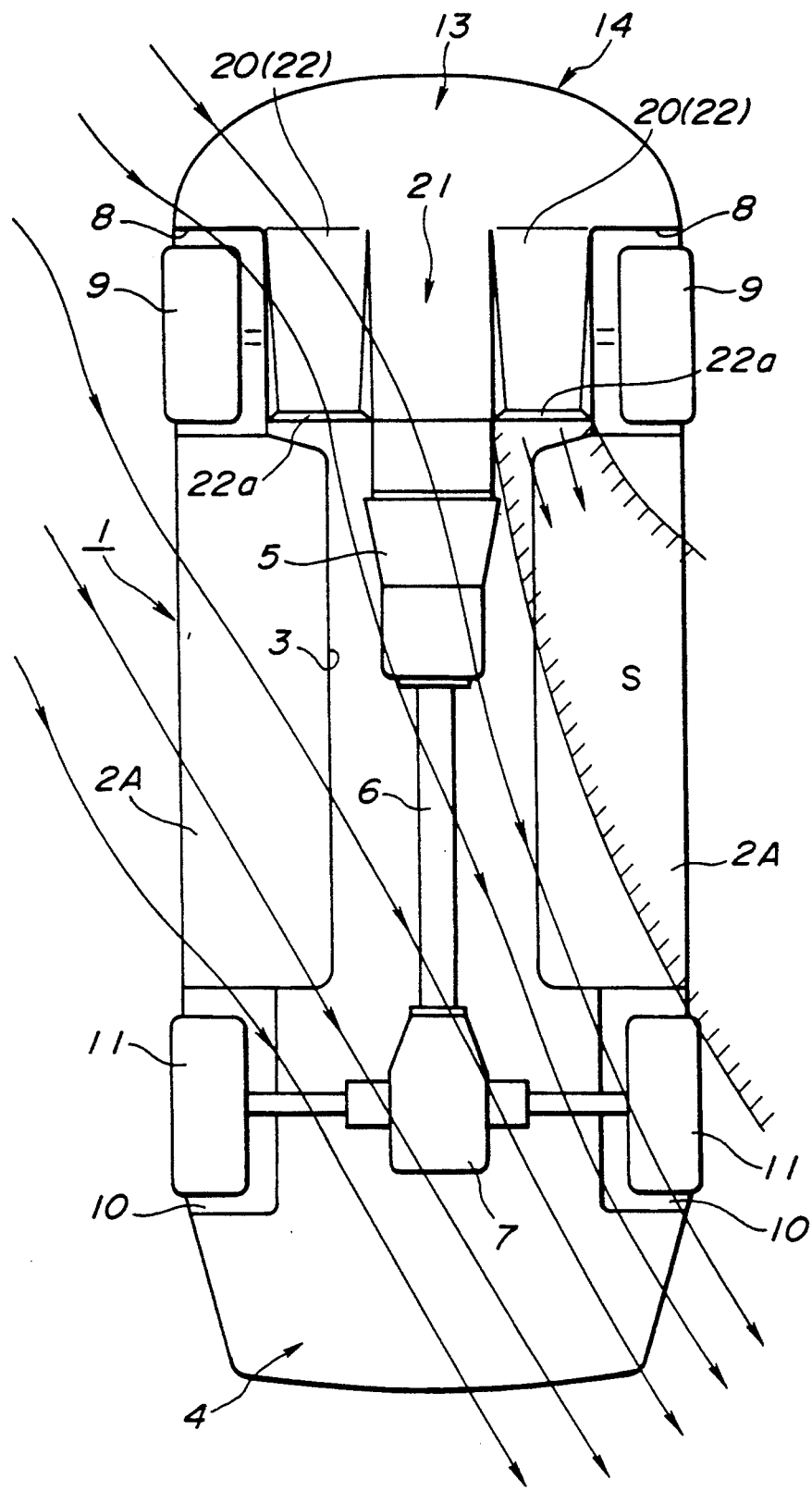
FIG. 6 is a bottom view showing the bottom of a vehicle according to a fifth embodiment of the invention.
Figure 7:
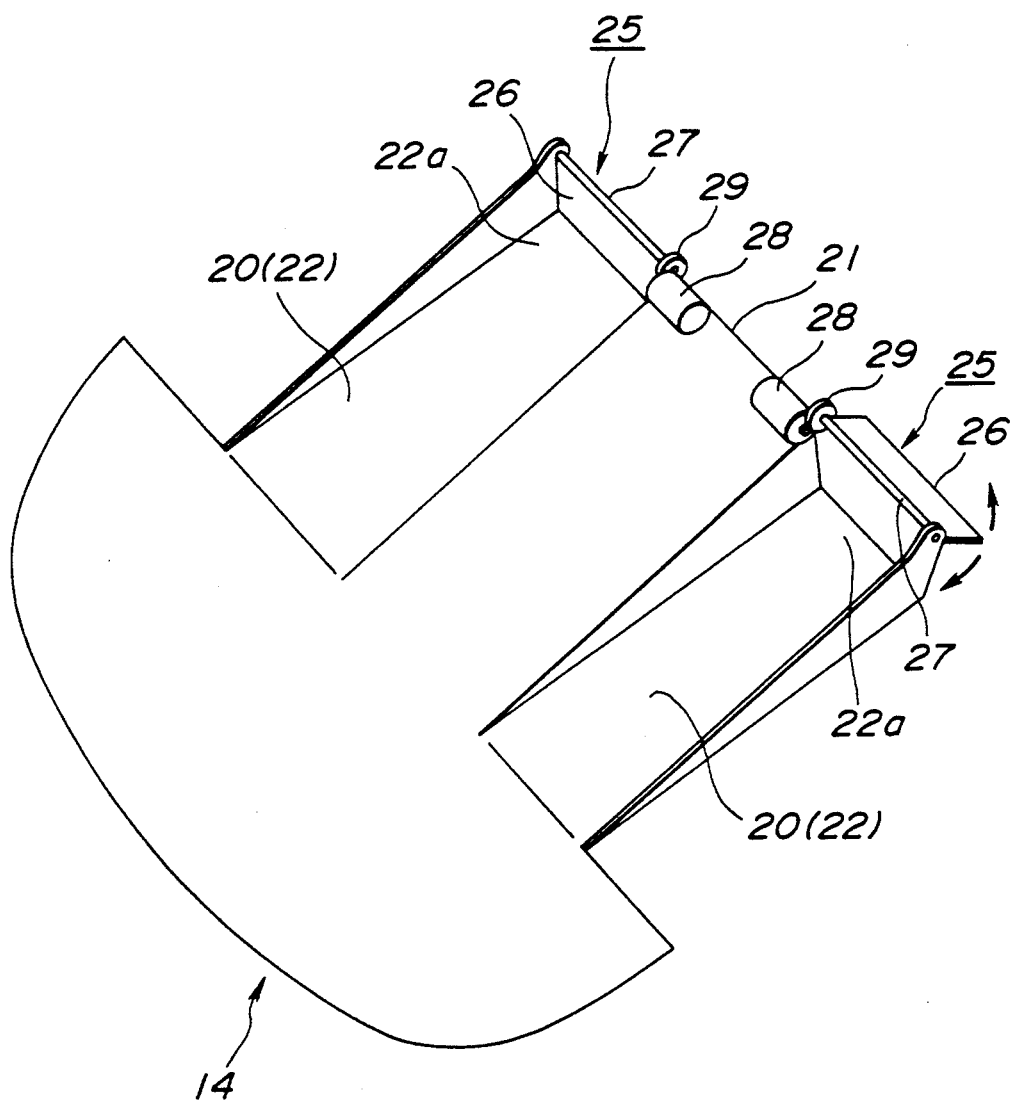
FIG. 7 is a perspective view showing a front under cover of the vehicle shown in FIG. 6.

FIGS. 6 and 7 show a vehicle underfloor structure according to a fifth embodiment of the invention. The vehicle shown in FIGS. 6 and 7 includes a shutter control system for shutting one of the open ends 22a of the left and right side channel 22 in dependence on the direction of a side (cross) wind. The shutter system of this example comprises a side wind detector, and left and right shutter mechanisms 25. Each shutter mechanism 25 includes a shutter plate (or flap) 26 swingable on a pivot shaft 27, an actuator 28 such as an electric motor, and a gearing 29 for transmitting motion from the actuator 28 to the shaft 27. Each shutter plate 26 of this example is swingably supported at the upper side. Each shutter plate 26 is held substantially vertical (substantially parallel to the z and y axes) in its closing position to close the rear duct end 22a, and the lower end of the shutter plate 26 swings up about the pivot shaft 27 substantially parallel to the y axis to open the rear duct end 22a.

When the vehicle receives a side wind of a speed equal to or higher than a predetermined speed level, this shutter control system closes the open rear end 22a on the upwind side, and holds the open rear end 22a on the downwind side open. In the example shown in FIG. 6, the end 22a of the left side channel 22 on the upwind side is closed, and the end 22a of the right side channel 22 on the downwind side is open. Therefore, the flow rate of the air discharged from the open end 22a of the right side channel 22 on the downwind side is increased, and there is formed a high pressure, slow underfloor stream S flowing from the open end 22a of the right side channel 22 toward the right rear wheel 11. This high pressure stream S acts to contract the high speed underfloor stream from the upwind side. By so doing, the high pressure downwind side stream S increases the speed of the upwind side stream and lowers the pressure of the upwind side stream. As a result, the lift acting on the rear of the vehicle is reduced.

Figure 11:
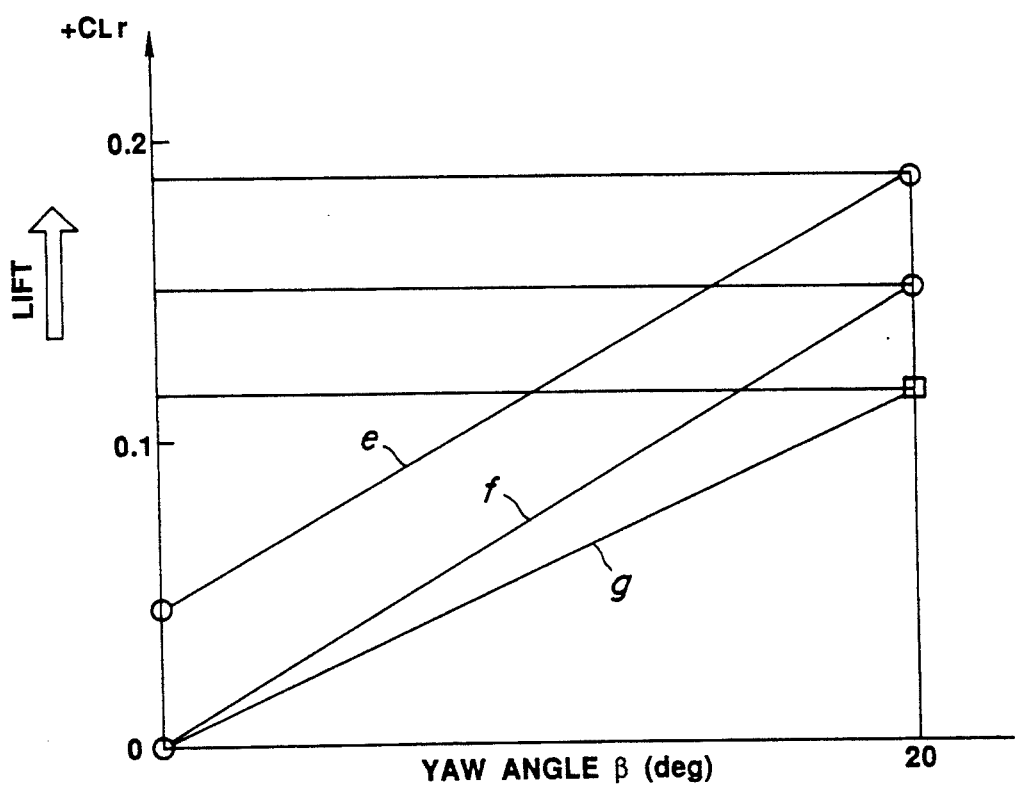
FIG. 11 shows an effect of the fifth embodiment.

FIG. 11 shows characteristics of a rear wheel lift acting on the rear wheels 11 in the side wind. In the graph of FIG. 11, lines e, f and g show, respectively, the characteristics of a reference vehicle equipped with no under cover, a vehicle equipped with a conventional under cover shown in FIG. 28, and a vehicle equipped with the under cover 14 and the shutter control system shown in FIGS. 6 and 7. The conventional under cover of the vehicle f can reduce the lift force acting on the rear wheels as compared with the reference vehicle e. In the vehicle f, however, the rear wheel lift differs widely depending on the aerodynamic yaw angle $\beta$ (or aerodynamic sideslip angle) which is the angle of yaw between the vehicle body longitudinal x axis and the wind direction. The lift is low when the vehicle is moving straight ahead relative to the wind, and the aerodynamic yaw angle is approximately 0°. As the aerodynamic yaw angle $\beta$ increases, the lift is increased steeply to a high level at a yaw angle of 20° as shown by the line f. On the other hand, the shutter control system according to the fifth embodiment of the invention can further reduce the rear wheel lift, and lower the rate of increase of the lift with respect to the aerodynamic yaw angle as shown by the line g which is less steep than the line f. In this way, the fifth embodiment of the invention can improve the steering stability of the vehicle.

Figure 12:
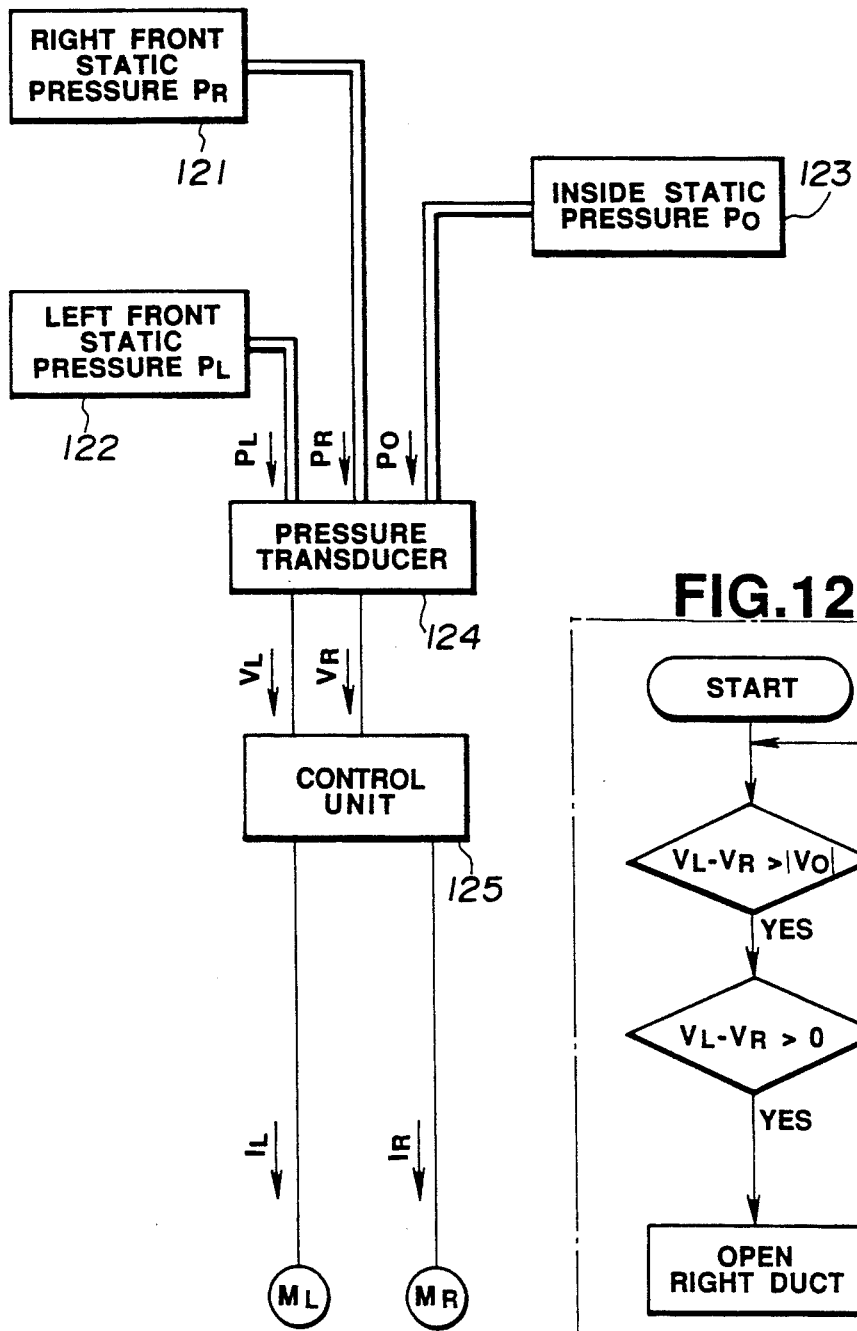
FIG. 12A is a schematic view showing a shutter control system which can be used in the fifth embodiment.
FIG. 12B is a flow chart showing a control procedure performed by a control unit in the shutter control system shown in FIG. 12A.
Figure 12B:
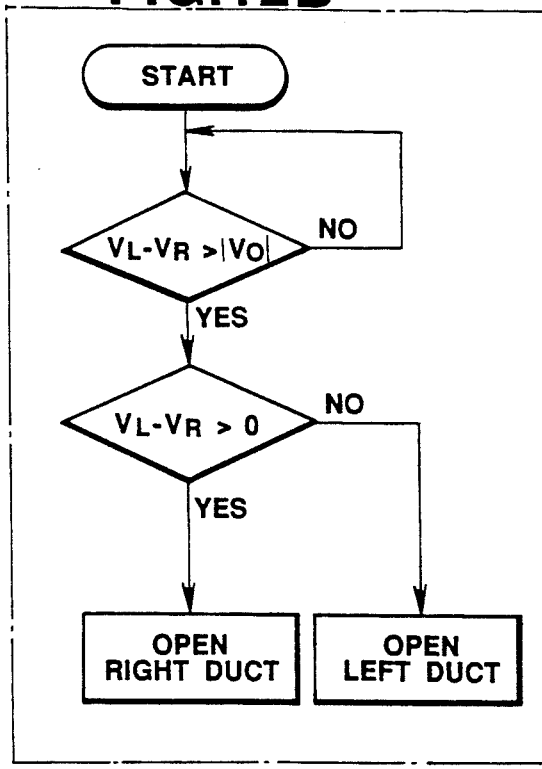

FIGS. 12A and 12B show a side wind detector, and a shutter control unit which can be used in the fifth embodiment.

The side wind detector of this example comprises first second and third tubes 122, 121 and 123 and a pressure transducer 124. The first tube extends from a front left hole (or orifice) formed in the outside surface of the front left corner of the vehicle body, to the pressure transducer 124. Similarly, the second tube 121 forms a fluid communication between a front right hole formed in the outside surface of the front right corner of the vehicle body, and the pressure transducer 124. For example, each of the left and right front holes is formed at the corner between the left or right front fender and the front bumper of the vehicle body. Each hole is circular, and its diameter is about 1~2 mm. The inside diameter of the tubes is substantially equal to the diameter of the circular holes. In the same manner, the third tube 123 introduce a reference pressure from the passenger compartment of the vehicle, to the pressure transducer 124. For example, the hole at the end of the third tube 123 is positioned under a seat where the air is stagnant. The thus-arranged tubing 122, 121 and 123 obtains a left front surface static pressure PL at the front left corner of the vehicle body, a right front surface static pressure PR at the front right corner, and an inside static pressure Po in the passenger compartment of the vehicle, and supplies these three pressures to the pressure transducer 124. The pressure transducer 124 of this example produces a first electric signal VL (V) representing PL-Po (mmAq, for example) and a second electric signal VR representing PR-Po, and delivers these electric signals to a shutter control unit 125. As the pressure transducer 124, it is possible to employ a pressure transducer available under the name of "PSI" from Pressure System Inc.

The shutter control unit 125 performs a control procedure shown in FIG. 12B and controls the positions of the left and right shutter plates 26 by controlling a left motor ML of the left actuator 28 and a right motor MR of the right actuator. In the control procedure shown in FIG. 12B, the control unit 125 first determines whether the difference between the first and second input signals VL and VR is greater than the absolute value of a predetermined value Vo. If it is, then the control unit 125 determines whether VL is greater than VR or not. When VL>VR, the control unit 125 opens the rear end of the right duct 22 by controlling a motor drive signal IR. When VL-VR is smaller than (or equal to) zero, the control unit 125 opens the rear end of the left duct 22 by controlling a motor drive signal IL for the left motor ML. The first step of FIG. 12B may be arranged so that the control unit 125 determines whether the absolute value of the difference between the first and second input signals VL and VR is greater than a predetermined positive value (Vo).

Figure 13:
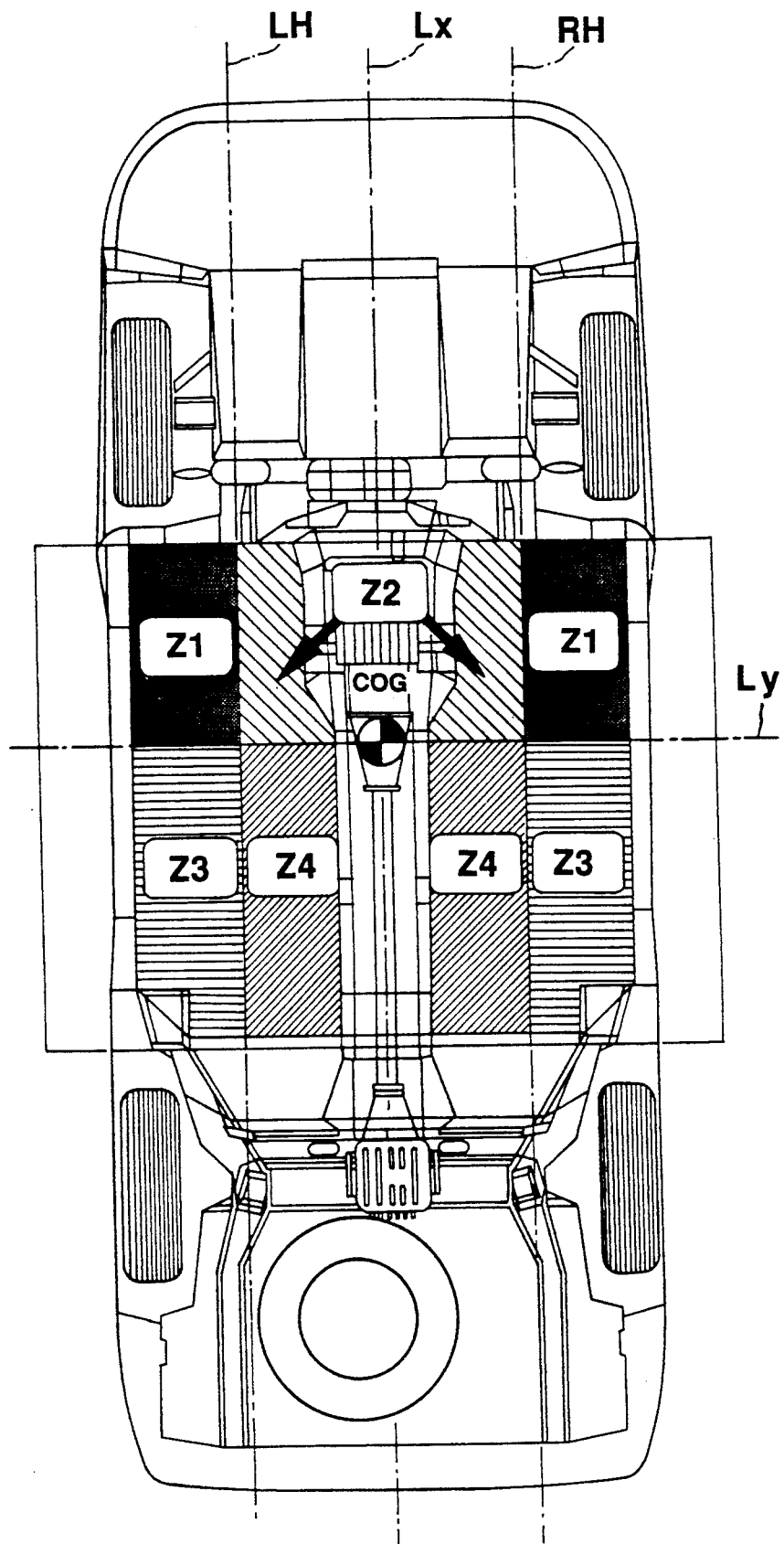
FIG. 13 is a bottom view illustrating zones Z1, Z2, Z3 and Z4 to facilitate understanding a sixth embodiment of the invention.
Figure 14:
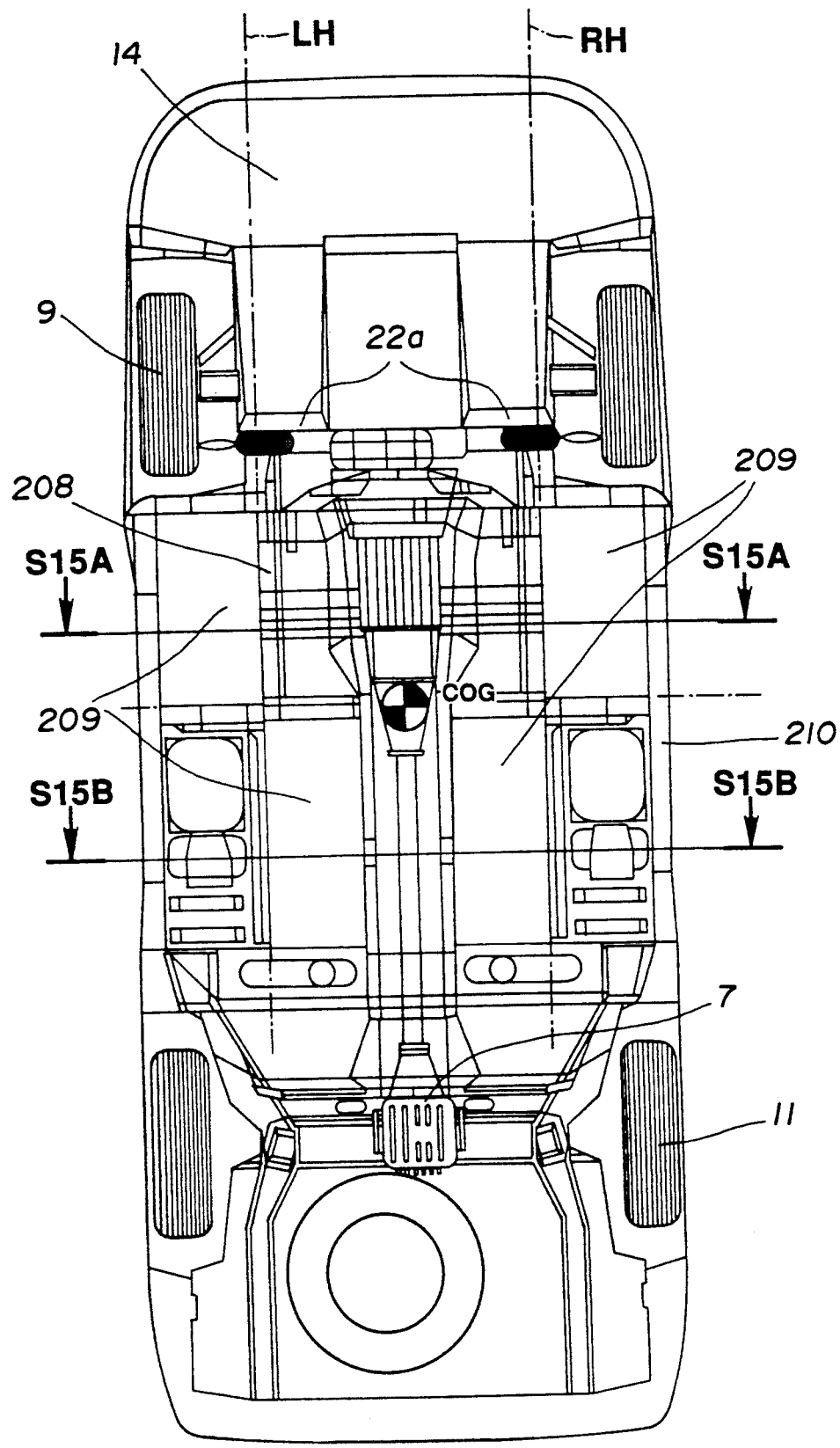
FIG. 14 is a bottom view showing the bottom of a vehicle according to the sixth embodiment of the invention.

FIGS. 14, 15A and 15B show a vehicle underfloor structure according to a sixth embodiment of the present invention. A vehicle shown in FIG. 14 comprises a front structure defining a front (engine) compartment and a center floor structure. The bottom of the front compartment is closed by a front under cover 14 which is substantially identical to the under cover 14 shown in FIGS. 1 and 2. The center floor structure defines a vehicle body bottom surface between the front and rear wheel housings, and comprises a center floor (panel) 204, as a main component. The center floor structure of this embodiment further comprises four flat under covers 209, and left and right floor side members 208. The under covers 209 are designed to flatten predetermined zones (or regions) under the center floor 204. The center floor 204 has a floor tunnel 207 which is an upward bulged middle portion, and left and right lateral side portions which are separated by the floor tunnel 207. In this embodiment, the area of each side portion of the center floor 204, as viewed in the bottom view, is divided into four zones (or regions) Z1, Z2, Z3 and Z4, as shown in FIG. 13, by an imaginary vertical lateral y-z plane (Ly) appearing in the bottom view of FIG. 13, by an imaginary lateral straight line Ly, and by an imaginary left or right vertical longitudinal plane (LH or RH) appearing in the bottom view as an imaginary longitudinal straight line LH or RH parallel to the imaginary vertical center (x-z) plane appearing as a vehicle center line Lx, in the bottom view of FIG. 13. The lateral plane Ly passes through the center of gravity (COG) of the vehicle, and contains the vehicle body lateral y axis. In this example, each of the left and right longitudinal lines LH and RH extends along and on a corresponding one of the left and right side members 208 extending, respectively, along extensions of the wheel houses.

The center floor structure of this embodiment is substantially symmetrical so that the center floor structure can be divided into substantially equivalent left and right halves by the center vertical x-z plane Lx. Accordingly, the distance of the left longitudinal plane LH from the center vertical plane Lx is equal to the distance of the right longitudinal plane RH from the center vertical plane Lx. As shown in the bottom view of FIG. 13, the left longitudinal plane LH is located on the inboard side of each of the cavities of the left side front and rear wheel housings, and is very close to each of these front and rear wheel housing cavities. In the example shown in FIG. 14, the left longitudinal plane LH passes through the left side channel 22 of the front under cover 14, closely along outboard side wall of the left side channel 22. In the example shown in FIG. 14, the left side longitudinal plane LH passes through the left floor side member 208 as if to split the left side member 208 lengthwise into long halves. The right plane RH is located in the symmetrical manner.

On the left side of the center floor structure, for example, the first zone (or region) Z1 is bounded on the inboard side by the left longitudinal plane LH, and by the lateral y-z plane Ly on the rear side. The second zone Z2 is bounded on the outboard side by the longitudinal plane LH, and by the lateral plane Ly on the rear side. The third zone Z3 is bounded by the lateral plane Ly on the front side, and by the left longitudinal plane LH on the inboard side. The fourth zone Z4 is bounded by the lateral plane Ly on the front side and by the left longitudinal plane LH on the outboard side. The first and second zones Z1 and Z2 are located only on the front side of the lateral plane Ly, and the third and fourth zones Z3 and Z4 are on the rear side of the lateral plane Ly. The first and third zones Z1 and Z3 are on the outboard side of the left longitudinal plane LH. The first zone Z1 extends from the rear end of the left front wheel housing toward the left rear wheel housing. The third zone Z3 extends in front of the rear wheel housing. The four zones Z1–Z4 on the right side of the center floor structure are defined in the equivalent bilateral symmetrical manner.

In each of the left and right sides of the center floor structure shown in FIG. 14, the first and fourth zones Z1 and Z4 are made substantially flat by the under covers 209, whereas the second and third zones Z2 and Z3 are not made flat. The bottom surface of this embodiment has a checkered pattern somewhat similar to a checkerboard. In this embodiment, the first and fourth zones Z1 and Z4 correspond to first and second flat regions, and the second and third zones Z2 and Z3 correspond to first and second uneven regions. On the left side, for example, the front outboard under cover 209 forming the first flat region Z1 has an outboard end fixed to a longitudinally extending, left side sill 210 through a stay member 214, and an inboard end fixed to the longitudinally extending left side member 208, as shown in FIG. 15A. The rear inboard under cover 209 on the left side, for example, has an outboard end fixed to the left side member 208, and an inboard end fixed through a stay member 213 to the center floor 204 at a position adjoining the floor tunnel 207 as shown in FIG. 15B. The side member 208 is fixed to the underside of the center floor 204, and each under cover 209 is fixed to the downward facing flat surface of the side member 208, as shown in FIGS. 15A and 15B. The left front outboard under cover 209 shown in FIG. 15A exists only on the outboard side of the left side member 208, and extends from the left side member 208 to the left side sill 210. The left rear inboard under cover 209 shown in FIG. 15B exists only on the inboard side of the left side member 208, and extends from the left side member 208 toward the floor tunnel 207. The under covers 209 are located under the center floor 204. The under covers 209 on the right side are fixed to the center floor member 204 in the equivalent bilateral symmetrical manner. Each under cover 209 is in the form of a flat plate of resin or metal such as steel. In this example, the first and second flat regions are formed by the under covers 209. Instead of using the under covers 209, however, it is possible to form these flat regions directly in the center floor 204 by shaping the corresponding portions of the center floor 204 flat.

Figure 23:
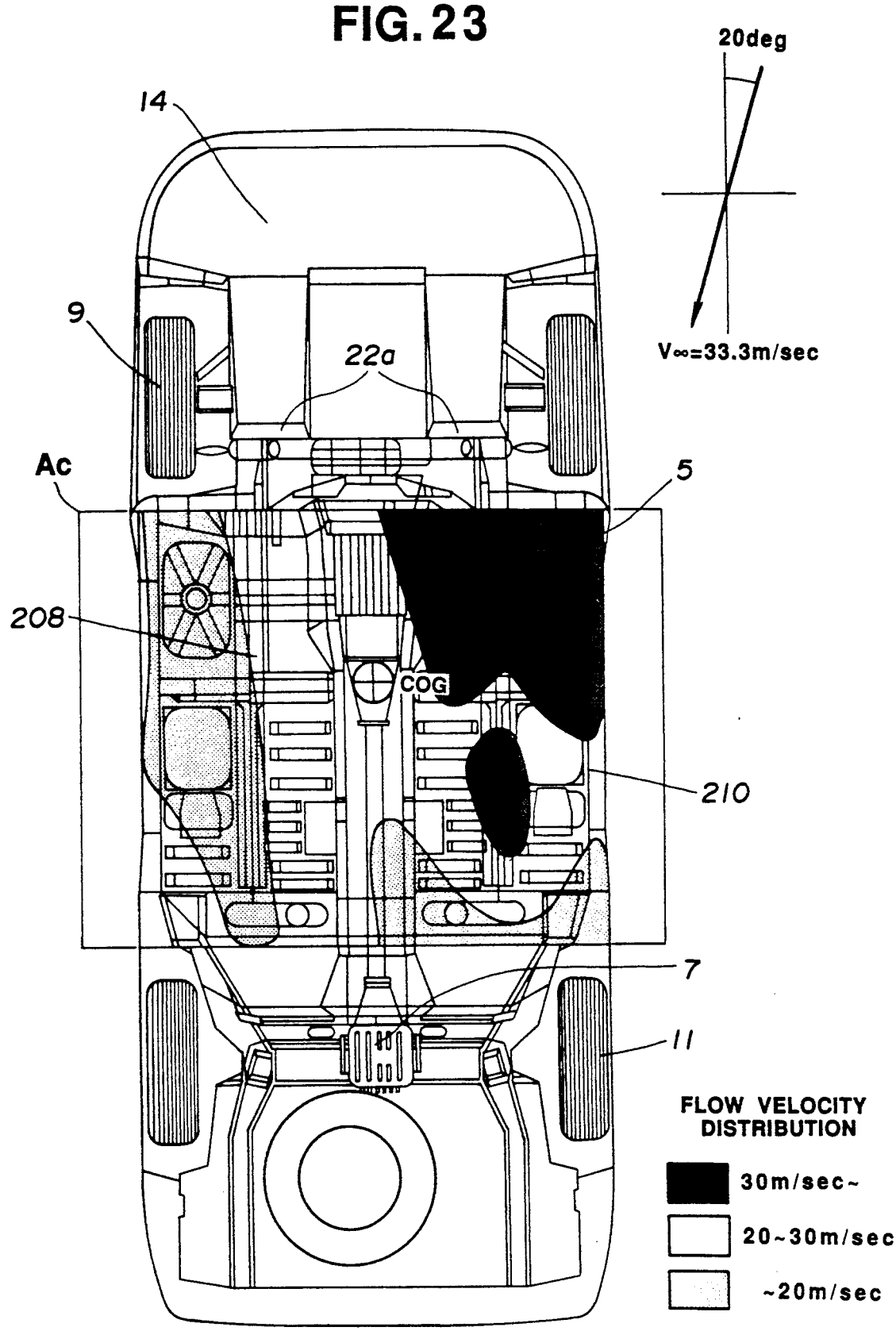

FIGS. 22 and 23 illustrate the results of experiments in a manner to visualize various underfloor air streams behind the front under cover 14 in the vehicle in which the center floor is not flattened, and various beads are exposed. FIG. 22 shows the straight wind situation, and FIG. 23 shows the side wind situation. A center air stream SA shown in FIG. 22 is a high speed flow flowing on the vehicle center line. This center stream SA is contracted by second streams SB on the both sides, and increased in speed. This center stream SA cools the transmission 5 and the rear differential 7 effectively. The second streams SB are left and right side slow streams discharged from the engine room. The left and right side low speed air streams SB expand laterally as they flow toward the rear wheels 11, and decrease the drag forces which the rear wheels receive. Left and right streams SC are outermost streams each flowing on the outboard side of the adjacent second stream SB. Each outermost stream SC is contracted by the front wheel while passing through the wheel housing, and further contracted by the adjacent second stream SB so that the flow speed is increased.

FIGS. 16 and 17 illustrate the results of experiments in the case of the vehicle shown in FIG. 14. FIG. 16 shows underfloor streams when the vehicle is moving straight ahead relative to the wind, and FIG. 17 shows underfloor air streams when the vehicle is receiving a side wind. In FIGS. 16 and 17, Ac indicates a plane in which air flow velocities are measured. Each of the four zones Z1-Z4 on the left side, for example, functions as follows. The right side zones Z1-Z4 function in the same manner.

(1) Front Outboard Zone Z1

When the vehicle is moving straight ahead relative to the approaching wind: The fast outermost stream SC flows under the flat zone Z1, and accordingly further increases the velocity. This flat zone Z1 is specifically effective in decreasing the air resistance.

When the vehicle is receiving a side wind: This zone Z1 is located ahead of the center of gravity COG. The floor resistance acting on this front zone, therefore, creates a yawing moment tending to turn the vehicle toward the downwind side. The zone Z1 which is made flat is effective in reducing the floor resistance and hence this aerodynamically induced yawing moment. Furthermore, the flat zone Z1 acts to increase the speed of the air stream at the lower portion of the side sill on the downwind side. In this case, the side sill, if its cross section is shaped so as to reduce the radius of curvature, promotes a separation (burble) of the air stream as the air velocity increases, and prevents the air stream from flowing toward the body side. As a result, this underfloor structure can reduce the negative pressure on the body side surface on the downwind side, and reduce the yawing moment.

(2) Front Inboard Zone Z2

Straight ahead operation: In order to further improve the fairing effect of the rear wheel by the hot air stream SB discharged from the engine compartment through the side channel 22, it is important to further decrease the speed of this hot air stream SB under the zones Z2 and Z3. Most of the hot stream SB flows under the zone Z2 which is left uneven, and is further slowed down. Accordingly, the center flow SA is further contracted, made faster, and improved in the cooling ability for cooling the transmission and the differential. In this case, a form drag which the second zone Z2 receives is sufficiently low because the air velocity is low in this zone, as compared with the other zones. Furthermore, the underfloor structure having no under cover in this second zone Z2 can increase the volume of the underfloor space under this zone, and by so doing, make smooth the hot sir stream discharged from the engine room. Consequently, this under floor structure can improve the performance of a radiator and other heat exchangers installed in the engine room.

Operation in a side wind: In the side wind, the hot air stream significantly slows down the underfloor air stream from the upwind side. The floor resistance acting on this second zone Z2 located ahead of the center of gravity creates a yawing moment tending to turn the vehicle toward the downwind side. However, the flow speed of the hot air stream under this zone is relatively slow, so that the increase of the floor resistance and the increase of the yawing moment are small.

(3) Rear Outboard Zone Z3

Straight ahead operation: The form drag (air resistance) acting on the rear wheel is determined by the flow speed of the air stream flowing under this zone in the straight ahead operation. It is noted that the form drag the rear wheel receives is overwhelmingly greater than the form drag of the floor in this zone. This third zone Z3 is therefore left uneven to decrease the flow velocity under this zone, and to decrease the air resistance of the vehicle as a whole. The combination of the first and second uneven zones Z2 and Z3 significantly improve the fairing effect at the rear wheel.

In the side wind: In order to reduce the yawing moment, it is important to cause the underfloor stream under this zone to flow up to the body side on the downwind side, and to create a negative pressure on the body side surface. In this case, a force pulling the rear portion of the vehicle body at the rear of the center of gravity, toward the downstream side creates a counter yawing moment about the yawing axis passing through the center of gravity. The rear outboard zone Z3 is uneven, has a relatively high floor resistance, and further creates counter yawing moment due to a side force acting on this zone. Moreover, this uneven zone Z3 can reduce the air flow velocity with the resistance of the floor. Therefore, this zone can prevent separation at the side sill adjoining this zone, and help create the negative pressure on the body side surface by allowing the underfloor stream to flow smoothly to the body side surface. This effect can be further improved by increasing the radius of curvature of the cross section of the rear portion of the side sill adjoining this zone.

(4) Rear Inboard Zone Z4

Straight ahead situation: In the straight ahead condition, the contracted and speeded center stream SA gradually diffuses and slows down in this zone Z4. This zone Z4, however, can minimize the expansion and decrease in the air flow speed with its flat bottom surface to improve the down force and the cooling effect of the transmission and differential.

Side wind situation: When the yaw angle becomes higher, the underfloor stream under this zone flows so as to impinge the rear wheel. In this embodiment, this zone is made flat. Therefore, this flat zone Z4 can increase the form drag of the rear wheel by allowing the fast air stream to impinge on the rear wheel, and thereby increase the counter yawing moment.

Figure 24:
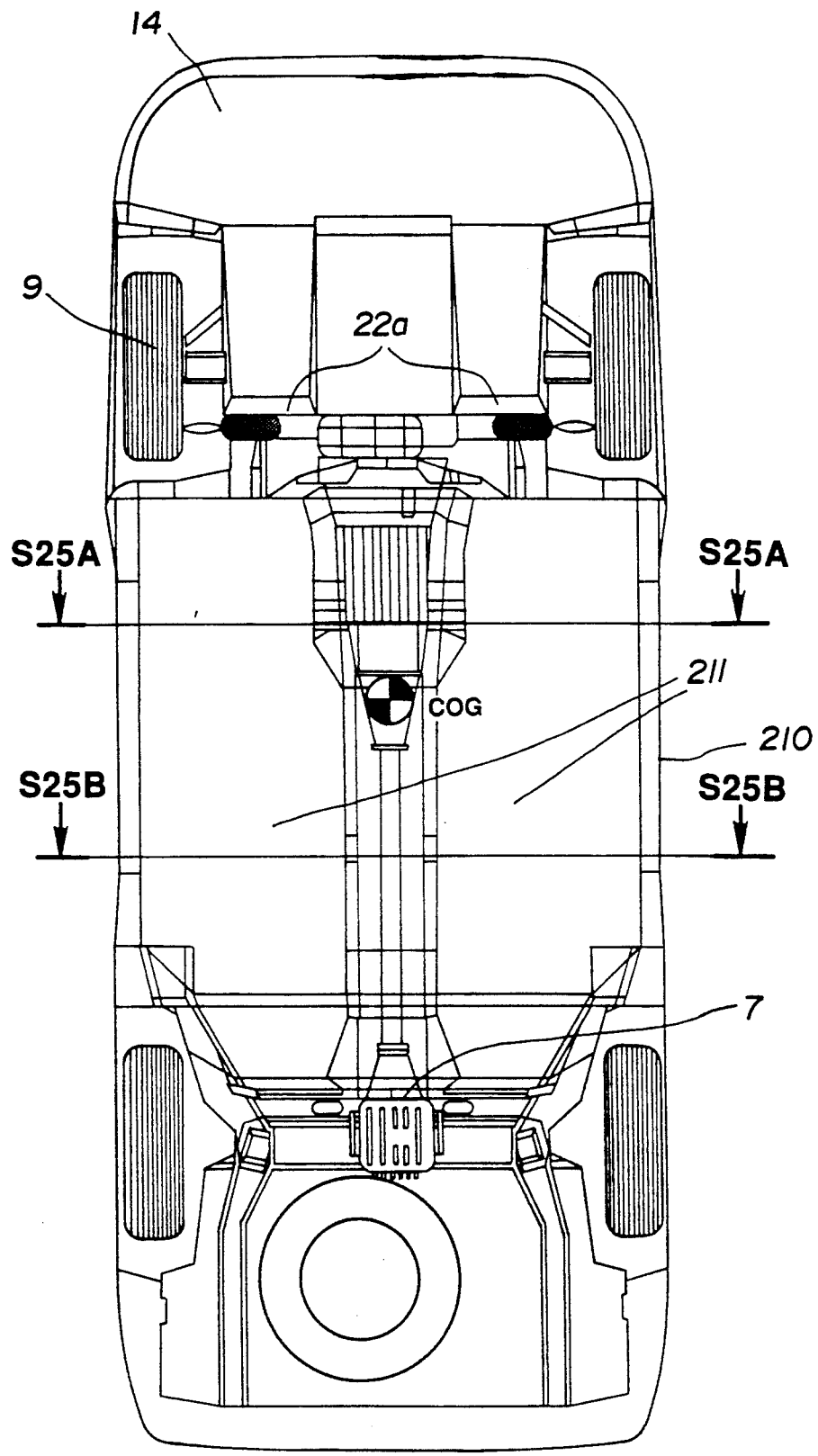
FIG. 24 is a bottom view showing a vehicle having the front under cover according to the first embodiment and a full flat center floor structure.

FIGS. 24, 25A and 25B show an underfloor structure having the front under cover (14) according to the present invention, and a full flat center floor structure in which the zones Z1–Z4 are all made flat with flat under covers 211. FIG. 26 shows an underfloor flow velocity distribution in this full flat center floor structure when the vehicle is moving straight ahead relative to the wind, and, FIG. 27 shows an underfloor flow velocity distribution when the vehicle is receiving a side wind.

Figure 18:
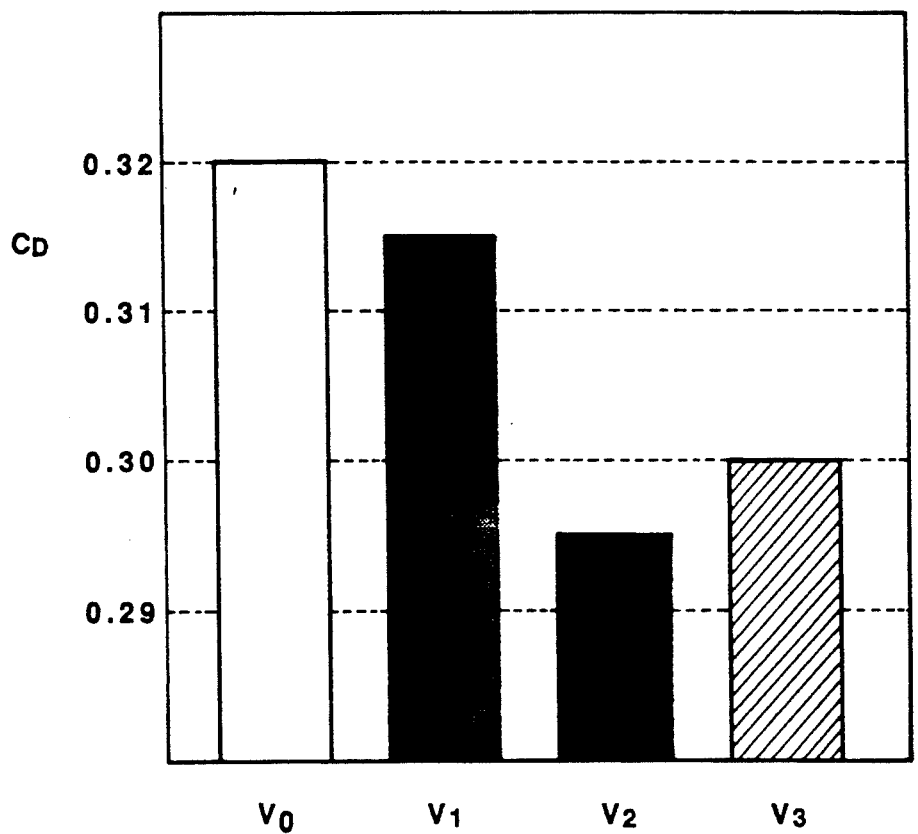
FIGS. 18, 19 and 20 are graphs showing improvement in CD, Cym and cooling wind velocity by the underfloor structure according to the six embodiment.
Figure 19:
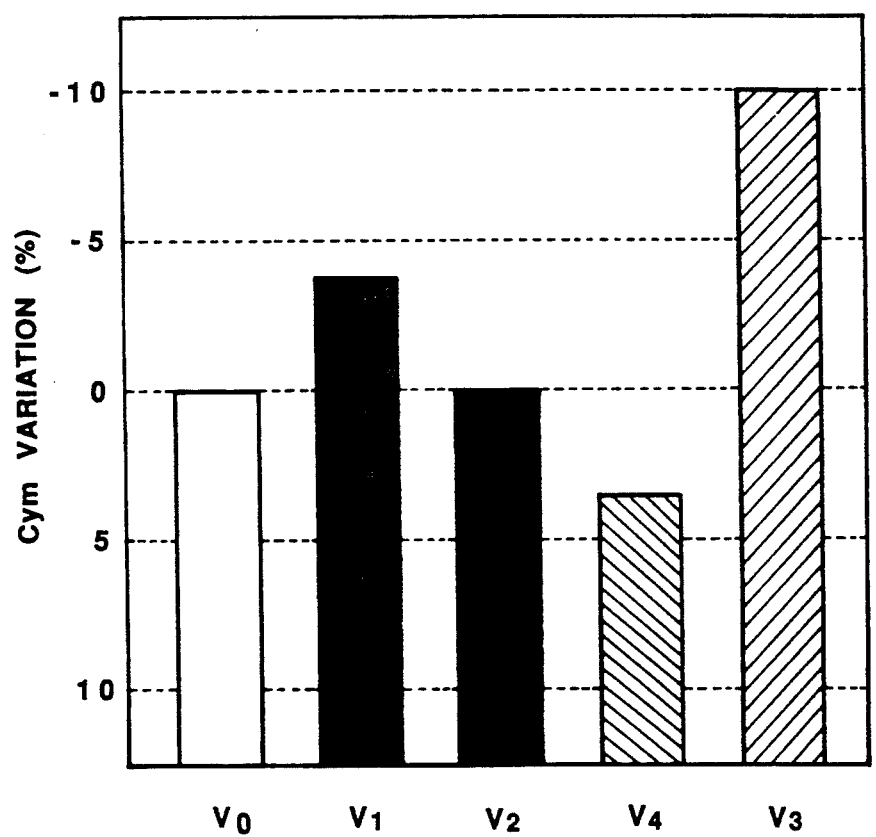
Figure 20:
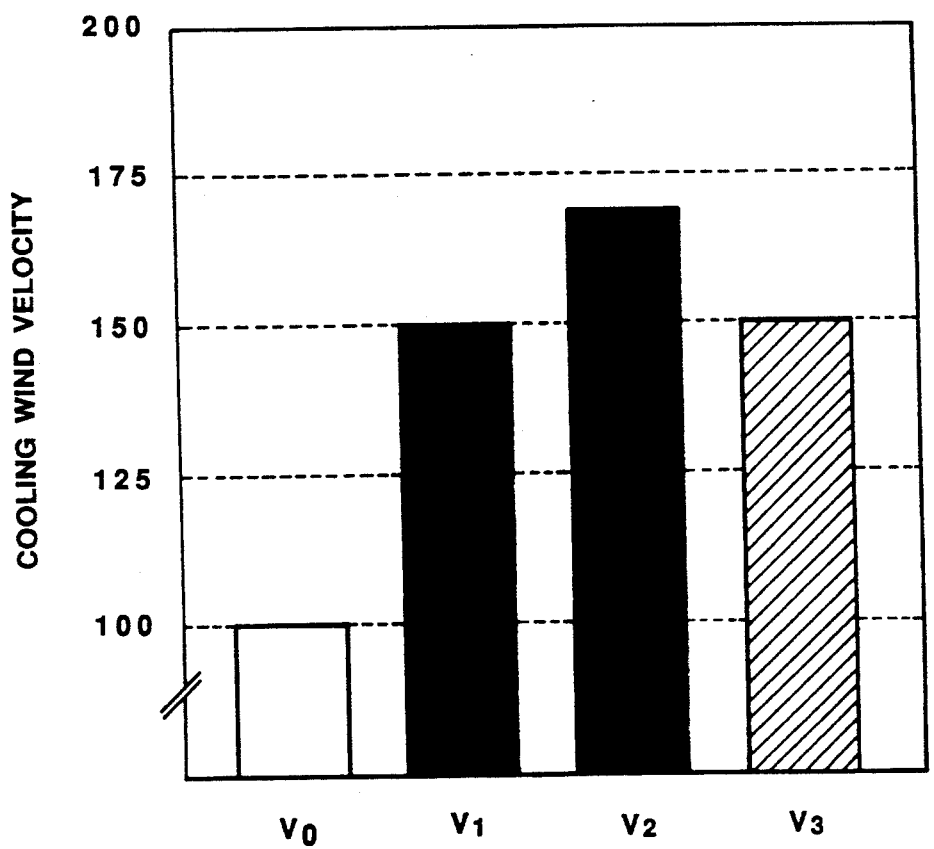

FIGS. 18, 19 and 20 show effects obtained by the vehicle according to the sixth embodiment of the invention. In these figures, Vo, V1, V2, V3 and V4 denote, respectively, a reference vehicle which is equipped with neither the front under cover 14 nor the center floor structure according to the sixth embodiment, and first, second, third and fourth vehicles each having the front under cover 14 shown in FIG. 14. The first vehicle V1 has a center floor which is not made flat as shown in FIGS. 22 and 23. The second vehicle V2 has the center floor structure according to the sixth embodiment of the invention, as shown in FIG. 14. The third vehicle V3 has the full flat center floor structure as shown in FIG. 24. The fourth vehicle V4 has the center floor structure shown in FIGS. 21A and 21B. The center floor structure according to the sixth embodiment of the present invention can reduce both of the drag force (coefficient) CD as shown in FIG. 18, and the yawing moment (coefficient) Cym as shown in FIG. 19, and improve the cooling efficiency of the transmission and differential as shown in FIG. 20. The Cym variations in FIG. 19 are measured by using as a standard, the yaw angle characteristic of the reference vehicle Vo. The cooling wind velocities shown in FIG. 20 are dimensionless values obtained by regarding the value of the reference vehicle Vo as being equal to 100.

A Japanese Utility Model Provisional Publication No. 2-61792 shows a vehicle body having left and right side air dams designed to reduce the yawing moment. However, this side air dam design decreases a vertical clearance to ground near the rear wheels, and prevent an underfloor air stream on the downwind side from flowing to the body side at the rear vehicle portion on the rear side of the center of gravity.

FIGS. 21A and 21B show a variation of the sixth embodiment. A vehicle shown in FIGS. 21A and 21B is the same as the vehicle shown in FIG. 14 except for the following points. The vehicle shown in FIG. 21A and 21B has left and right side sills 290 each of which has a front sill portion adjoining the left or right first zone Z1, and a rear sill portion adjoining the left or right third zone Z3 and having a cross sectional shape which is different from that of the front sill portion. The front sill portion of each sill 290 shown in FIG. 21A is located on the front side of the imaginary lateral vertical plane (Ly) passing through the center of gravity of the vehicle, and the rear sill portion of each sill 290 is located on the rear side of the lateral vertical plane Ly. Each of the front and rear sill portions of the left and right side sills 290 has a lower outside surface facing downwards, a side surface facing laterally away from the imaginary center vertical plane, and a corner along which the lower outside surface and the side surface meet. The cross section of the corner of the front sill portion of each sill, obtained if cut by an imaginary lateral plane parallel to the lateral plane containing the lateral axis and the vertical axis of the vehicle, is in the form of a curved line whose radius of curvature R1 is small as shown in FIG. 21A. The cross section of the corner of the rear sill portion of each sill is in the form of a curved line whose radius of curvature R2 is greater than the radius of curvature R1 of the front sill portion. In the example shown in FIG. 21A, the corner of the front sill portion of each sill is almost in the form of an angled edge. The sharply curved corner of the front sill portion of each sill acts to prevent the underfloor air stream from flowing up to the body side on the downwind side. On the other hand, the gradually and smoothly curved corner of the rear sill portion of each sill allows the underfloor stream to flow to the body side. In this way, the side sill design shown in FIGS. 21A and 21B further decreases the yawing moment acting on the vehicle.

In the illustrated embodiments of the invention, the engine is mounted on the front of the vehicle, and the drive system including the transmission 5 is arranged to drive the rear wheels. However, the present invention is applicable to vehicles having a rear engine or a midship engine. In these cases, the high air pressure portion is formed behind a radiator and an oil cooler installed in a front compartment of the vehicle, or in the front portion of the vehicle receiving a dynamic pressure. The under cover according to the present invention may take various forms. The present invention is not limited to the illustrated front under cover, but is applicable to a vehicle having a simple flat floor.

What is claimed is:

1. An underfloor structure of a vehicle, comprising: a first under member which comprises a flat portion for closing an underside of a high pressure portion formed in a front part of the vehicle, left and right discharge portions for discharging inside air in said high pressure portion to an outside of the vehicle, respectively, toward rear wheels of the vehicle, and a throttle portion for contracting an outside air stream flowing under said first under member from a front of the vehicle, and for guiding the outside air stream toward an underfloor unit placed under a floor of the vehicle, said left and right discharge portions being located approximately symmetrically with respect to a vehicle center line of the vehicle, said throttle portion extending between said left and right discharge portions.

2. An underfloor structure according to claim 1 wherein a width of said throttle portion is approximately equal to a width of said underfloor unit under the floor.

3. An underfloor structure according to claim 1 wherein each of said left and right discharge portions defines a duct comprising a sloping surface which slopes down toward the rear of the vehicle, and which is depressed below a floor surface, and an open end which is formed near a rear end of said first under member, and wherein said throttle portion is formed between inboard side walls of said ducts of said left and right discharge portions.

4. An underfloor structure according to claim 3 wherein said duct of each of said left and right discharge portions is shaped so that a width of the duct becomes greater toward the rear of the vehicle, and wherein said throttle portion is shaped so that a width of said throttle portion becomes smaller toward the rear of the vehicle.

5. An underfloor structure according to claim 1 wherein each of said left and right discharge portions defines a duct comprising a sloping surface which slopes down to a rear end toward the rear of the vehicle, said rear end of said sloping surface of each duct being depressed below a floor surface of said flat portion of said first under member, said rear end of said sloping surface defining an open end which is formed at a rear end of said first under member, and wherein said underfloor structure further comprises left and right baffle plates projecting downwardly from a downwardly facing lower surface of said first under member, and said left and right baffle plates are placed approximately symmetrically with respect to a center line of the vehicle between said left and right discharge portions, said baffle plates forming said throttle portion whose width becomes smaller toward the rear of the vehicle.

6. An underfloor structure according to claim 3 wherein said underfloor structure further comprises left and right front wheel housings, left and right rear wheel housings, and a center floor structure which comprises a center floor defining a floor of the vehicle between said front wheel housings and said rear wheel housings, said center floor structure defining left and right flat outboard bottom surface regions in an underside of said center floor, each of said left and right outboard flat surface regions being located on an outboard side of a straight line extending, respectively, from a front point to a rear point, said open ends of said ducts of said left and right discharge portions being located, along a widthwise direction of the vehicle, between said front points, and along a lengthwise direction of the vehicle, between the front of the vehicle, and an imaginary straight line passing through said front points, a distance between said front points being substantially equal to a distance between an outboard end of said rear open end of said duct of said left discharge portion and an outboard end of said rear open end of said duct of said right discharge portion, said rear point on a left side of the vehicle being located at an outboard end of a front side of said left rear wheel housing, and said rear point on a right side of the vehicle being located at an outboard end of a front side of said right rear wheel housing.

7. An underfloor structure according to claim 1 wherein said under floor structure further comprises a shutter control system which detects a side wind, and which closes an air outlet of said left discharge portion when the left side of the vehicle is an upwind side, and closes an air outlet of said right discharge portion when the right side is an upwind side.

8. An under floor structure according to claim 1 wherein said underfloor structure further comprises left and right front wheel housings, and a center floor structure for forming a left front outboard Hat bottom surface which is made flat, and which extends between said left front wheel housing and an imaginary lateral axis of the vehicle passing through a center of gravity of the vehicle, a right front outboard flat bottom surface which is made flat and which extends between said right front wheel housing and said lateral axis passing through the center of e gravity, a left front inboard uneven bottom surface which is not made flat and which is located on the rear side of said left discharge portion so that an air stream discharged from said left discharge portion flows underneath said left front inboard uneven bottom surface, and which is located on the inboard side of said left front outboard flat bottom surface, and a right front inboard uneven bottom surface which is not made flat and which is located on the rear side of said right discharge portion so that an air stream discharge from said right discharged portion flows underneath said right front inboard uneven bottom surface, and which is located on the inboard side of said right front outboard flat bottom surface.

9. An underfloor structure according to claim 8 wherein said underfloor structure further comprises left and right rear wheel housings, and said center floor structure further forms a left rear outboard uneven bottom surface which is not made flat and which extends between said left rear wheel housing and said left front outboard flat, bottom surface, a right rear outboard uneven bottom surface which is not made flat and which extends between said right rear wheel housing and said right front outboard flat bottom surface, a left rear inboard flat bottom surface which is located on the inboard side of said left rear outboard uneven bottom surface and which is located on the rear side of said lateral axis, and a right rear inboard flat bottom surface which is located on the inboard side of said right rear inboard uneven bottom surface and which is located on the rear side of said lateral axis.

10. An underfloor structure according to claim 9 wherein said center floor structure comprises left and right floor side members extending along the lengthwise direction of the vehicle; said left and right front inboard uneven bottom surfaces and said left and right rear inboard flat bottom surfaces are bounded between said left and right floor side members.

11. An underfloor structure according to claim 10 wherein said center floor structure further comprises left and right side sills each of which comprises a front sill portion which adjoins one of said left and right front outboard flat bottom surfaces, and a rear sill portion which adjoins one of said left and right rear outboard uneven bottom surfaces and which comprises an outside curved surface whose cross sectional shape has a radius of curvature which is greater than that of said front portion.

12. A vehicle comprising:
an under member which defines a front compartment of the vehicle by closing an underside of said front compartment of the vehicle, said under member comprising left and right side portions defining left and right side upside channels for discharging air from an inside of said front compartment of the vehicle to an outside of said front compartment, toward a rear of the vehicle, and a middle portion defining a middle downside channel for guiding an outside air stream flowing under said under member toward the rear of the vehicle, said middle portion extending between said left and right side portions.

13. A vehicle according to claim 12 wherein said left side portion of said under member comprises a left side upper surface facing upwards and forms a bottom of said left side channel, said right side portion comprises a right side upper surface facing upwards and forming a bottom of said right side channel, and said middle portion comprises a middle lower surface facing downwards and forming a bottom of said middle channel which opens downwards.

14. A vehicle according to claim 13 wherein said left and right side channels are substantially symmetrical with respect to an imaginary center vertical plane which contains a longitudinal axis and a vertical axis of the vehicle so that each of said left and right channels is substantially a mirror image of the other, and said middle channel is substantially symmetrical with respect to said imaginary center vertical plane so that said middle channel can be divided by said center vertical plane into equivalent left and right halves.

15. A vehicle according to claim 14 wherein said left side portion comprises a rear end defining an open rear end of said left side channel, said right side portion comprises a rear end defining an open rear end of said right side channel, and said middle portion comprises a rear end forming a closed end of said front compartment.

16. A vehicle according to claim 15 wherein said left side upper surface extends from a front end to a rear end toward the rear of the vehicle along the longitudinal axis of the vehicle, and slopes down from said front end of said left side upper surface to said rear end which is depressed below said middle portion, and said right side upper surface also extends from a front end to a rear end toward the rear of the vehicle along the longitudinal axis of the vehicle, and slopes down from said front end of said right side upper surface to said rear end which is depressed below said middle portion.

17. A vehicle according to claim 16 wherein said under member further comprises left and right side outer upright portions, and left and right side inner upright portions for forming side walls of said left and right side upside channels and said middle downside channel, said left side channel is defined between said left side outer upright portion and said left side inner upright portion, said right side channel is defined between said right side outer upright portion and said right side inner upright portion, and said middle channel is formed between said left and right side inner upright portions.

18. A vehicle according to claim 17 wherein said under member further comprises a front portion, and a rear portion extending from said front portion toward the rear of the vehicle, said rear portion comprising said middle portion and said left and right side portions, said front portion and said middle portion being both flat and forming a continuous lower flat surface which is substantially perpendicular to the vertical axis of the vehicle.

19. A vehicle according to claim 18 wherein said vehicle further comprises left and right front wheels, left and right rear wheels, a left front wheel housing defining a space accommodating said left front wheel, and a right front wheel housing defining a space accommodating said right front wheel, and wherein said rear portion of said under member is bounded between said left and right front wheel housings.

20. A vehicle according to claim 19 wherein said middle channel is tapered toward the rear end of the vehicle so that a width of said middle channel becomes smaller toward the rear of the vehicle.

21. A vehicle according to claim 20 wherein said vehicle further comprises left and right baffle plates for serving as side walls of said middle channel, said left and right baffle plates projecting downwards from said middle lower surface of said middle portion and being placed symmetrically with respect to said imaginary vertical center plane.

22. A vehicle according to claim 20 wherein said left and right side inner upright portions define side walls of said middle channel; said left side channel is tapered toward a front of the vehicle so that a width of said left side channel becomes smaller from said open rear end of said left side channel toward the front of the vehicle; and said right side channel is also tapered toward the front of the vehicle so that a width of said right side channel becomes smaller from said open rear end of said right side channel toward the front of the vehicle, the width of each channel being a dimension measured along a lateral axis of said vehicle.

23. A vehicle according to claim 19 wherein said vehicle further comprises a shutter control system which detects a wind direction of a side wind and which closes one of said rear open ends of said left and right side channels in accordance with the wind direction so as to close said open rear end on an upwind side and hold said open rear end on a downwind side open.

24. A vehicle according to claim 23 wherein said shutter control system comprises a swingable left shutter plate for closing said open rear end of said left side channel, a swingable right shutter plate for closing said open rear end of said right side channel, an actuating means for moving said left and right shutter plates in accordance with a shutter control signal, a pressure transducing system for sensing an ambient air pressure at a left front portion of the vehicle and an ambient air pressure at a right front portion of the vehicle, and producing a left pressure electric signal representing the air pressure at the left front portion of the vehicle and a right pressure electric signal representing the air pressure at the right front portion of the vehicle, and a controller for producing said shutter control signal, said controller bringing said left shutter plate to an open position if said right signal is greater than said left signal by an amount which is greater than a predetermined value, and bringing said right shutter plate to an open position when said left signal is greater than said right signal by an amount which is greater than said predetermined value.

25. A vehicle according to claim 19 wherein said vehicle further comprises a left rear wheel housing defining a space accommodating said left rear wheel, a right rear wheel housing defining a space accommodating said right rear wheel, and a center floor structure which defines a center bottom surface of a vehicle body of said vehicle, said center bottom surface comprising a left side bottom surface extending between said left front wheel housing and said left rear wheel housing, a right side bottom surface extending between said right front wheel housing and said right rear wheel housing, and a middle bottom surface extending between said left and right side bottom surfaces, and wherein said left side bottom surface comprises a left side first flat region which is flat and which extends from a rear end of said left front wheel housing toward said left rear wheel housing and a left side first uneven region which is uneven and which is located at such a position, between said left side first flat region and said middle bottom surface, that said rear end of said left side channel opens toward said left side first uneven region, and that an air stream discharged from said left side channel flows under said left side first uneven region, said right side bottom surface comprises a right side first flat region which is flat and which extends from a rear end of said right front wheel housing toward said right rear wheel housing and a right side first uneven region which is uneven and which is located at such a position, between said right side first flat region and said middle bottom surface, that said rear end of said right side channel opens toward said right side first uneven region, and that an air stream discharged from said right side channel flows under said right side first uneven region.

26. A vehicle according to claim 25 wherein said left side first flat region is tapered so that a width of said left side first flat region becomes gradually smaller toward said left rear wheel housing, said right side first flat region is also tapered so that a width of said right side first flat region becomes gradually smaller toward said right rear wheel housing, said left side first uneven region extends to an outboard end of a front side of said left rear wheel housing, and said right side first uneven region also extends to an outboard end of a front side of said right rear wheel housing.

27. A vehicle according to claim 25 wherein said left side bottom surface further comprises a left side second uneven region extending from the front side of said left rear wheel housing toward said left front wheel housing, and a left side second flat region which is located between said left side second uneven region and said middle bottom surface, and said right side bottom surface comprises a right side second uneven region extending from the front side of said right rear wheel housing toward said right front wheel housing, and a right side second flat region which is located between said right side second uneven region and said middle bottom surface.

28. A vehicle according to claim 27 wherein each of said left and right side first flat regions is located only on a front side of an imaginary lateral vertical plane containing the lateral and vertical axes passing through a center of gravity of the vehicle, and each of said left side and right side second flat regions is located only on a rear side of said imaginary lateral vertical plane.

29. A vehicle according to claim 28 wherein said left side first flat region is bounded on an inboard side by an imaginary left vertical plane which is parallel to said center vertical plane, and which extends from an inboard side of said left front wheel housing to an inboard side of said left rear wheel housing, and said right side first flat region is bounded on the inboard side by an imaginary right vertical plane which is parallel to said center vertical plane and a distance of said right vertical plane from said center vertical plane is equal to a distance of said left vertical plane from said center vertical plane.

30. A vehicle according to claim 28 wherein said center floor structure comprises a center floor panel which is formed with a floor tunnel extending along the longitudinal axis, left and right floor side members which are fixed to an underside of said center floor panel and which extend in parallel to the longitudinal axis, respectively, on left and right sides of said center vertical plane, a left outboard flat under cover defining said left side first flat region and comprising an inboard end fixed to said left floor side member, a right outboard flat under cover defining said right side first flat region and comprising an inboard end fixed to said right floor side member, a left inboard flat under cover defining said left side second flat region and comprising an outboard end fixed to said left floor side member, and a right inboard flat under cover defining said right side second flat region and comprising an outboard end fixed to said right floor side member.

31. A vehicle according to claim 30 wherein said vehicle comprises a left side sill which is fixed to a left side of said center floor panel and which extends along the longitudinal axis, and a right side sill which is fixed to a right side of said center floor panel and which extends along the longitudinal axis, and wherein said left outboard flat under cover further comprises an outboard end fixed to said left side sill, and said right outboard flat under cover further comprises an outboard end fixed to said right side sill.

32. A vehicle according to claim 31 wherein each of said side sills comprises a front sill portion adjoining one of said first flat regions and a rear sill portion adjoining one of said second uneven regions, said rear sill portion of each side sill comprises a smoothly curved outside surface extending smoothly from a lower surface facing downwards and an outboard side surface facing laterally in an outboard direction, and said front sill portion of each side sill comprises a lower surface facing downwards, an outboard side surface facing laterally in the outboard direction, and an angled edge along which said lower surface and outboard side surface meet.

* * * * *